United States Patent
Zhu et al.

(10) Patent No.: US 11,356,898 B2
(45) Date of Patent: Jun. 7, 2022

(54) MEC SUPPORT FOR MULTI-ACCESS CONVERGENCE

(71) Applicant: Intel Corporation, Santa Clara, CA (US)

(72) Inventors: Jing Zhu, Portland, OR (US); Miltiadis Filippou, Munich (DE); Dario Sabella, Munich (DE)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 16/783,422

(22) Filed: Feb. 6, 2020

(65) Prior Publication Data
US 2020/0229038 A1 Jul. 16, 2020

Related U.S. Application Data

(60) Provisional application No. 62/801,890, filed on Feb. 6, 2019, provisional application No. 62/801,872, filed on Feb. 6, 2019.

(51) Int. Cl.
H04W 28/10 (2009.01)
G06F 9/54 (2006.01)
H04W 84/12 (2009.01)

(52) U.S. Cl.
CPC ............ H04W 28/10 (2013.01); G06F 9/546 (2013.01); H04W 84/12 (2013.01)

(58) Field of Classification Search
CPC ....... H04W 4/40; H04W 48/16; H04W 76/11; H04W 8/26; H04W 88/06; H04L 67/16; G16H 10/20; G06Q 30/018
See application file for complete search history.

(56) References Cited

U.S. PATENT DOCUMENTS

2019/0158606 A1* 5/2019 Guim Bernat .......... H04W 4/40
2020/0169610 A1* 5/2020 Wang ...................... H04W 4/60
2021/0153254 A1* 5/2021 Zhu ....................... H04W 76/11

OTHER PUBLICATIONS

"Mobile Edge Computing (MEC); Framework and Reference Architecture", ETSI GS MEC 003 V1.1.1 (Mar. 2016), (2016), 18 pgs.
"Mobile Edge Computing (MEC); UE application interface", ETSI GS MEC 016 V1.1.1, (Sep. 2017), 21 pgs.
"Analysis of LTE—WiFi Aggregation Solutions", https: www. netmanias.com en post reports 8532 laa-lte-lte-u-lwa-mptcp-wi-fi analysis-of-lte-wifi-aggregation-solutions, (Mar. 21, 2016), 13 pgs.
(Continued)

Primary Examiner — Iqbal Zaidi
(74) Attorney, Agent, or Firm — Schwegman Lundberg & Woessner, P.A.

(57) ABSTRACT

Methods, apparatus, systems and machine readable storage media of a multi-access edge computing (MEC) component operating in a multi-access management services (MAMS) framework are described. In an example, traffic on multi-radio links between a user equipment (UE) and a network is observed. Based on the observing, the traffic is managed by transmitting messages of a traffic management application programming interface (API) over a dedicated reference point.

20 Claims, 25 Drawing Sheets

(56) References Cited

OTHER PUBLICATIONS

Kanugovi, S, "Multiple Access Management Services draft-kanugovi-intarea-mams-framework-02", https: tools.ietf.org html draft-kanugovi-intarea-mams-framework-02, (Sep. 4, 2018), 139 pgs.

Zhu, J, "User-Plane Protocols for Multiple Access Management Service draft-zhu-intarea-mams-user-protocol-06", https: tools.ietf.org html draft-zhu-intarea-mams-user-protocol-06, (Oct. 19, 2019), 21 pgs.

* cited by examiner

MEC SUPPORT FOR MULTI-ACCESS CONVERGENCE

PRIORITY CLAIM

This application claims the benefit of priority to U.S. Application Ser. No. 62/801,872, filed Feb. 6, 2019, and to U.S. Application Ser. No. 62/801,890, filed Feb. 6, 2019, each of which are incorporated herein by reference in their entirety.

TECHNICAL FIELD

Embodiments described herein generally relate to edge computing and related distributed computing environments. In particular, embodiments relate to techniques for achieving session and service continuity (SSC) across Wireless Local Area Network (WLAN) and cellular network deployments in edge computing, multi-access edge computing (MEC), and Internet of Things (IoT) device networks, and to techniques for implementing a MEC-based system to realize a cross-layer, multi-access convergence in mobility scenarios.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service which offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing may be further integrated with use cases and technology developed for the Internet of Things (IoT) and Fog networking, as endpoint devices and gateways attempt to access network resources and applications at locations moved closer to the "edge" of the network. For instance, developing edge computing use cases in mobile network settings have been designed for integration with multi-access edge computing (MEC), also known as "mobile edge computing." MEC approaches are designed to allow application developers and content providers to access computing capabilities and an IT service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. In some MEC systems, a user equipment (UE) can communicate with both WLAN and cellular infrastructure (e.g. LTE). This can lead to interoperability and session and service continuity issues. UE mobility can also introduce a number of corresponding technical challenges relating to security, processing and network resources, service availability and efficiency, among other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following provides a detailed discussion of techniques within specific systems and services, but which are applicable to the larger context of IoT, fog network, and edge computing deployments. Further, the disclosed MEC and MAMS system and service deployment examples provide one illustrative example of a fog device or fog system, but many other combinations and layouts of devices and systems located at the edge of a network may be provided. Further, the techniques disclosed herein may relate to other IoT and network communication standards and configurations, and other intermediate processing entities and architectures.

Figure 1:
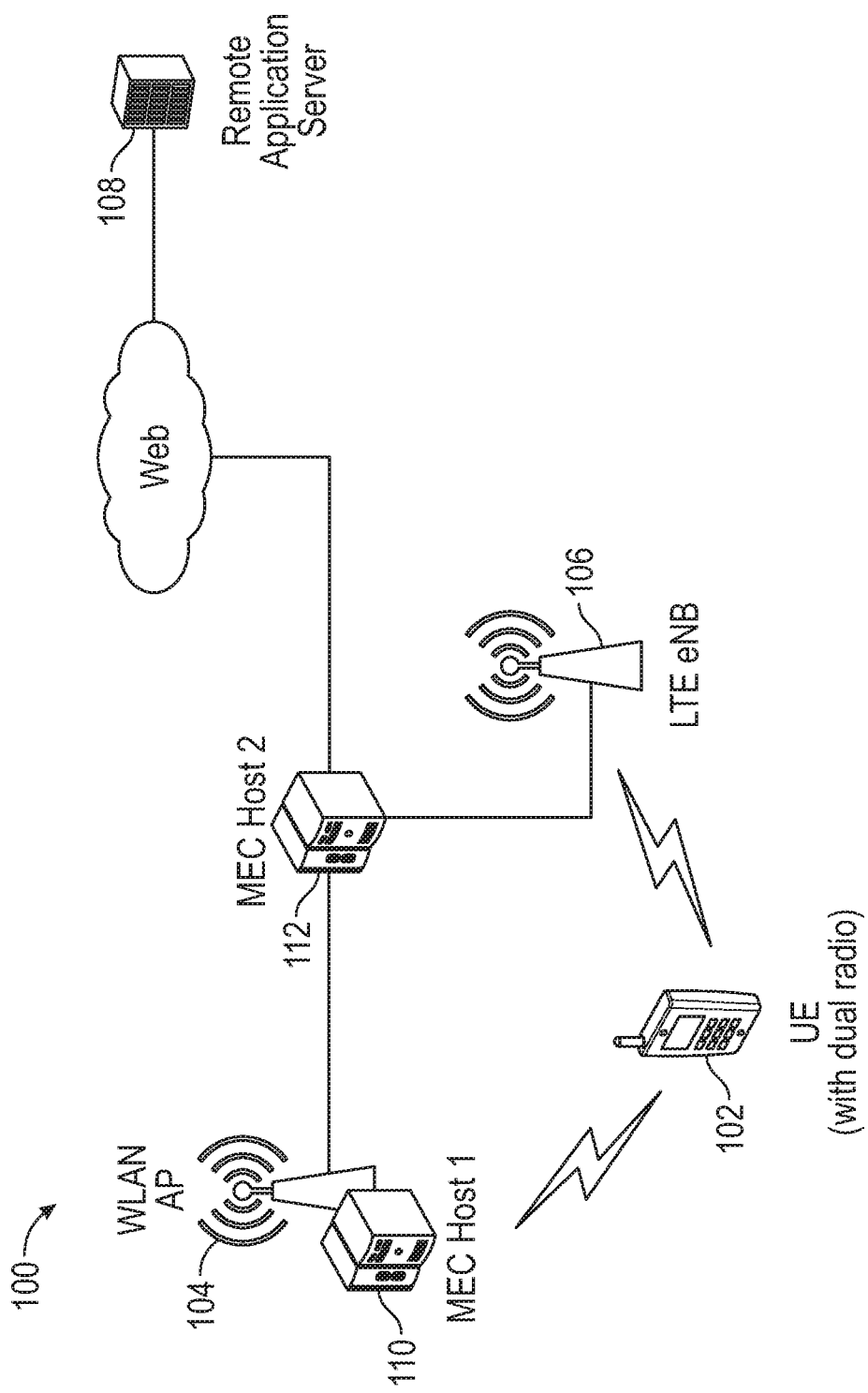
FIG. 1 illustrates a system in which any one or more of the techniques (e.g., operations, processes, methods, and methodologies) discussed herein may be performed.

FIG. 1 illustrates a MEC system 100 in which any one or more of the techniques (e.g., operations, processes, methods, and methodologies) discussed herein may be performed. A user equipment (e.g., UE 102) may communicate using one or both of a WLAN network (using, e.g., a WLAN access point (AP) 104) and a cellular network (using, e.g., a base station 106) infrastructure elements. The UE 102 can communicate with applications at the edge of the network and with remote applications (traditionally instantiated far from the client/UE side at, e.g., a remote application server 108). The system 100 can include MEC hosts (e.g., MEC host 1 110 and a MEC host 2 112, which can be similar to MEC host 350 (FIG. 3)) to ensure service continuity and multi-access management services (MAMS). The UE 102, WLAN AP 104 and MEC hosts can be indoors or outdoors or any combination thereof.

MEC, like other edge computing deployments, may reduce network congestion by operating applications, data functions, and discovery, etc. closer to the user (e.g., mobile device, UE, station (STA), etc.). Some MEC details dealing with security (e.g., both user security as well as application integrity), radio use, etc., have been promulgated by ETSI, such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC architectures offers application developers and content providers cloud-computing capabilities and an IT service environment at the edge of the network. This environment is characterized by ultra-low latency and high bandwidth as well as real-time access to radio network information that can be leveraged by applications. MEC technology thus permits flexible and rapid deployment of innovative applications and services towards mobile subscribers, enterprises and vertical segments. For instance, in automotive settings, applications such as V2X (vehicle-to-everything, IEEE 802.11p based or 3GPP LTE-V2X based) may use MEC technology to exchange data, provide data to aggregation points, and access data in databases to provide and obtain an overview of the local situation derived from a multitude of sensors (by various cars, roadside units, etc.).

MEC is intended to support developing mobile use cases of edge computing, to allow application developers and content providers to access computing capabilities and an IT service environment in dynamic settings at the edge of the network. MEC offers application developers and content providers cloud-computing capabilities and an IT service environment using equipment located closer to network (e.g., cellular network) edges. This environment is characterized by ultra-low latency and high bandwidth as well as real-time access to radio network information that may be leveraged by applications. MEC technology permits operators to flexibly and rapidly deploy innovative applications and services towards mobile subscribers, enterprises and vertical segments.

Spectrum scarcity and the resulting increased spectrum licensing fees have created the need to come up with solutions incorporating multi-access convergence. Thus, in the existence of cellular-based deployments overlaid by Wi-Fi hotspots, supporting dual-radio UEs (as depicted in FIG. 1), LTE-LWAN aggregation solutions have been introduced both at the radio link and TCP level. Aggregation solutions can include link aggregation and path aggregation. IETF is also working on MAMS, a programmable framework to manage and configure various multi-access convergence solutions.

Figure 2:
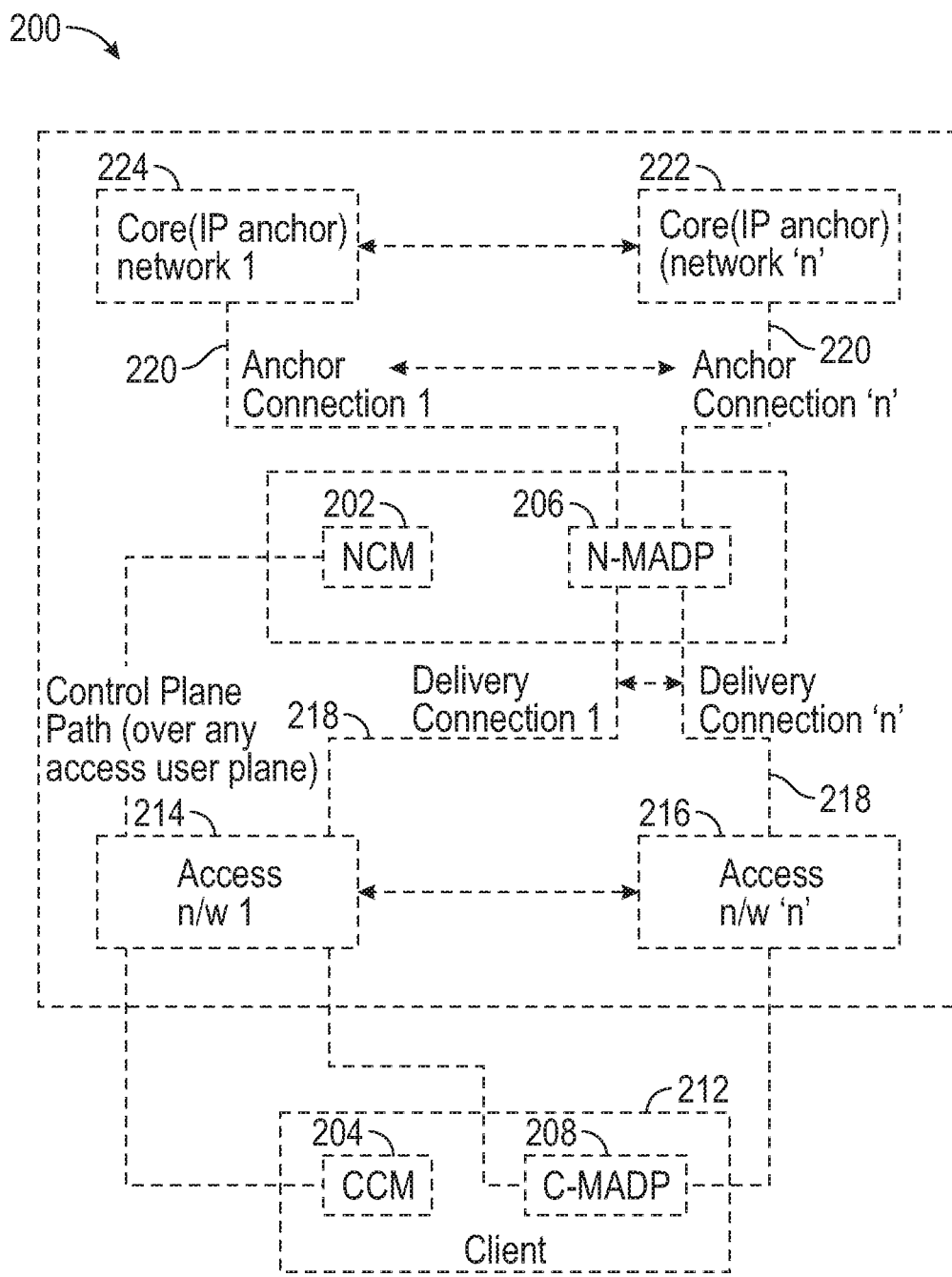
FIG. 2 depicts a block diagram of a multi-access management service (MAMS) framework, according to an example.

FIG. 2 depicts a block diagram of a MAMS framework 200, according to an example. MAMS framework 200 includes control-plane elements Network Connection Manager (NCM) 202 and Client Connection Manager (CCM) 204. NCM 202 configures network paths and user plane protocols based on client negotiation. CCM 204 negotiate client capabilities and needs with the NCM 202 and configures network path usage. The NCM 202 and CCM 204 cooperate to enable dynamic selection of network paths. Data plane elements include the Network Multi-Access Data Proxy (N-MADP) 206 and the Client Multi-Access Data Proxy (C-MADP) 208. The C-MADP 208 handles the user data traffic forwarding across multiple network paths. C-MADP 208 is responsible for MAMS-related user-plane functionalities in the client. The N-MADP 206 is a functional entity in the multi-network path manager 210. The N-MADP 206 handles the user data traffic forwarding across multiple network paths at the network and handles MAMS-related user-plane functionalities in the network.

The client 212 is connected to multi-network path manager 210 through access networks 214, 216. Delivery connections 218 provide a network path from N-MADP 210 to the C-MADP 208. Anchor connections 220 provide a network path from the N-MADP 210 to IP anchors 222, 224 that have assigned an IP path to the client 212.

Currently-available solutions do not cover all possible scenarios needed for multi-access convergence and do not provide interoperability. Systems, methods and apparatuses according to embodiments, provide multi-access convergence at the application level, by configuring MAMS using, for example, MEC.

Figure 3:
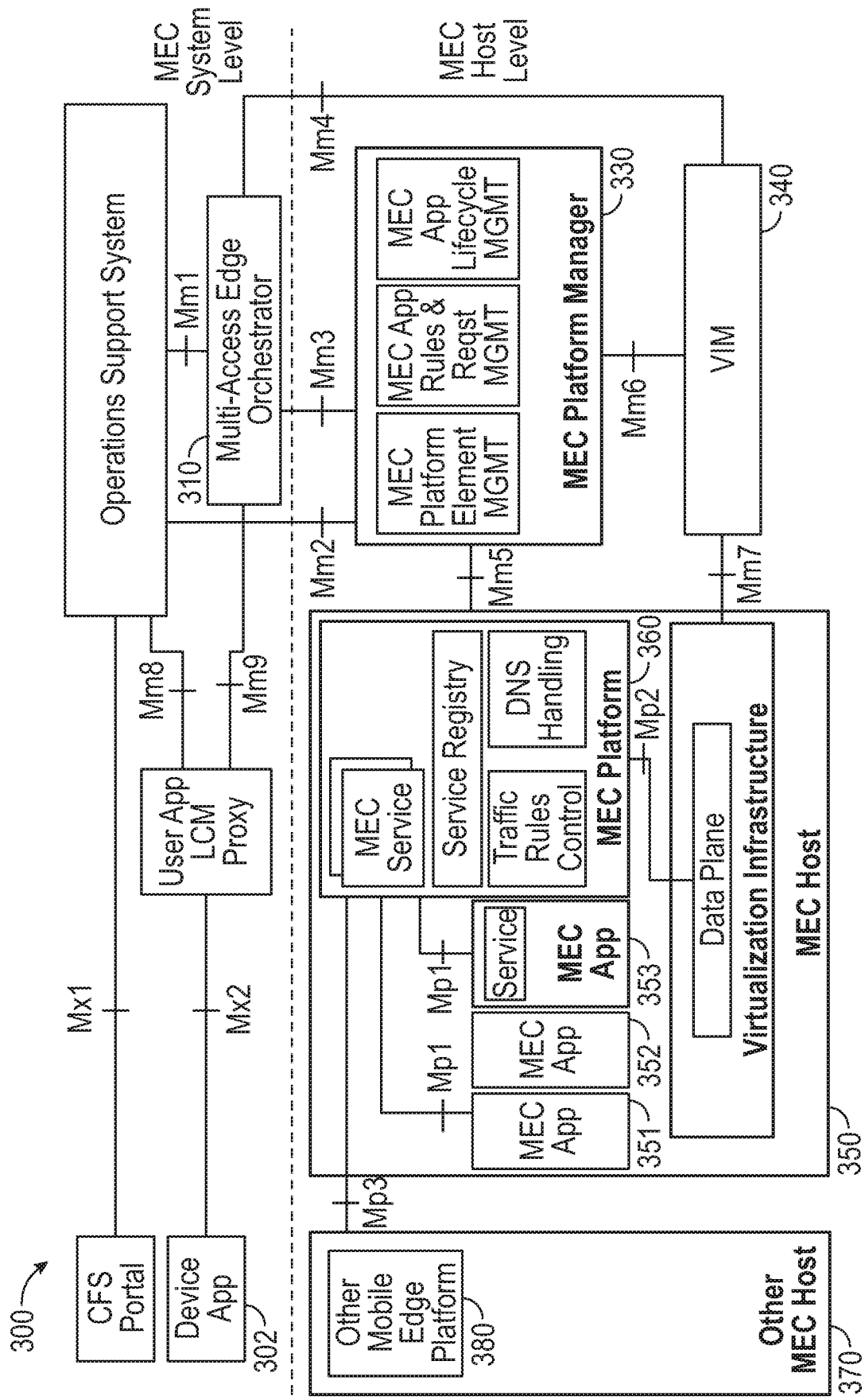
FIG. 3 illustrates a block diagram for a Multi-access Edge Computing (MEC) system architecture, according to an example.

FIG. 3 depicts a block diagram 300 for an example MEC system architecture. In an example, the MEC system architecture may be defined according to a specification, standard, or other definition (e.g., according to the ETSI ISG MEC-003 specification). In this diagram, Mp reference points refer to MEC platform functionality. Mm reference points refer to management; and Mx refers to connections to external entities. The services, applications, orchestrators, and other entities discussed herein may be implemented at any number of the entities of the MEC system architecture depicted in FIG. 3, and the communications to perform network operations may be implemented at any number of the interfaces of the MEC system architecture depicted in FIG. 3.

For instance, a device application 302 operating at a client user equipment device (e.g., smartphone) may access a multi-access edge orchestrator 310, as the orchestrator 310 coordinates system configuration or features of an edge computing host for fulfillment of services or applications. Further, a particular MEC host 350 may operate one or more MEC applications 351, 352, 353 or a platform 360 which provide a MEC resource or service via a virtual edge appliance. A virtualized infrastructure manager 340 and MEC Platform Manager 330 provide management of the use of the hosts, platforms, and resources, and may also provide managed access to an attestation service or verifier (not shown). The virtualized infrastructure manager 340 and MEC Platform Manager 330 may also provide managed access to other MEC hosts (e.g., host 370) or MEC platforms (e.g., platform 380), which may also be involved with uses of attestation functionality as described herein. MEC host 350 can perform operations described with respect to the MAMS Framework (FIG. 2), including, for example, NCM 202 and N-MADP 206 functionalities, although embodiments are not limited to performing just those functionalities of the MAMS framework.

Although not depicted in detail, various forms of wired or wireless connections may be configured to establish connectivity among nodes, including interconnections among MEC hosts 350 and 370 (FIG. 3) and connections to or from client 212 (FIG. 2). The implementation of the edge computing system may be provided at or on behalf of a telecommunication service provider ("telco", or "TSP"), internet-of-things service provider, cloud service provider (CSP), enterprise entity, or any other number of entities.

MEC Support for Multi-Access Convergence

In the following description, methods, configurations, and related apparatuses are disclosed for a MEC system, such as for scenarios in which a user equipment (UE) (e.g. a mobile device) application can communicate with an application at the edge of the network (MEC application) and a remote app (traditionally instantiated far from the client-UE side), and in which the UE is communicating with both WLAN and cellular infrastructure (e.g. LTE). The following examples introduce specific MEC-based enhancements, introducing a new MEC multi-access management service (MAMS) application programming interface (API) that will properly configure and manage a MAMS framework, including through exposing information through a mobile platform functionality reference point (e.g., Mp1) to MEC applications. These examples enable link aggregation and path aggregation of WLAN and cellular networks to efficiently manage connectivity.

The following techniques and configurations are usable in contexts where different network links (e.g., WLAN, cellular, UEs with dual radio) are deployed. The following enables MEC applications with different accesses and MEC hosts to exploit different types of network links. The following also provides an API to transparently enable the use of multiple network links with use of MEC applications and services.

As an example of conventional techniques, different levels of multi-access convergence for network access are possible through link aggregation and path aggregation. In existing systems, link aggregation can be supported by features like LTE-WLAN (LWA) and path aggregation can be supported by multi-path transmission control protocol (MPTCP). Current solutions, however, are unable to cover all cases for multi-access convergence. In particular, link aggregation is not supported without LWA and path aggregation currently has no standard implementation. Furthermore, these solutions are not well supported by all the network devices, as the market for such deployments is still fragmented, and do not provide an interoperable solution for multi-access convergence (for both link aggregation and path aggregation) that is managed at application level. Further, although MAMS supports different path aggregation mechanisms, this needs to be configured by proper cross-layer multi-access technologies (e.g., by MEC).

With the present techniques and configurations, a new MEC MAMS API may properly configure and manage a MAMS framework, which may include exposing information through an Mp1 reference point to MEC applications. This configuration may support link aggregation and path aggregation between WLAN and cellular networks to efficiently manage the connectivity. This configuration also may allow the MAMS decisions to be made either by the MEC host or the MEC application.

The present techniques and configurations may be utilized in connection with many aspects of current networking systems, but are provided with reference to IoT, MEC, MAMS, link aggregation, and path aggregation deployments. The present techniques and configurations specifically may be (but are not required to be) relevant to the standards and approaches published in ETSI GS MEC-003 "Mobile Edge Computing (MEC); Framework and Reference Architecture" (e.g., V2.0.3); ETSI GS NFV-SEC 013 "Network Functions Virtualisation (NFV) Release 3; Security; Security Management and Monitoring" (e.g., v. 3.1.1) and related MEC, NFV, or networked operational implementations. However, while the present techniques and configurations may provide significant benefits to MEC architectures and other IoT device network architectures, the applicability of the present techniques and configurations may be extended to any number of edge computing devices or fog computing platforms.

Figure 4:
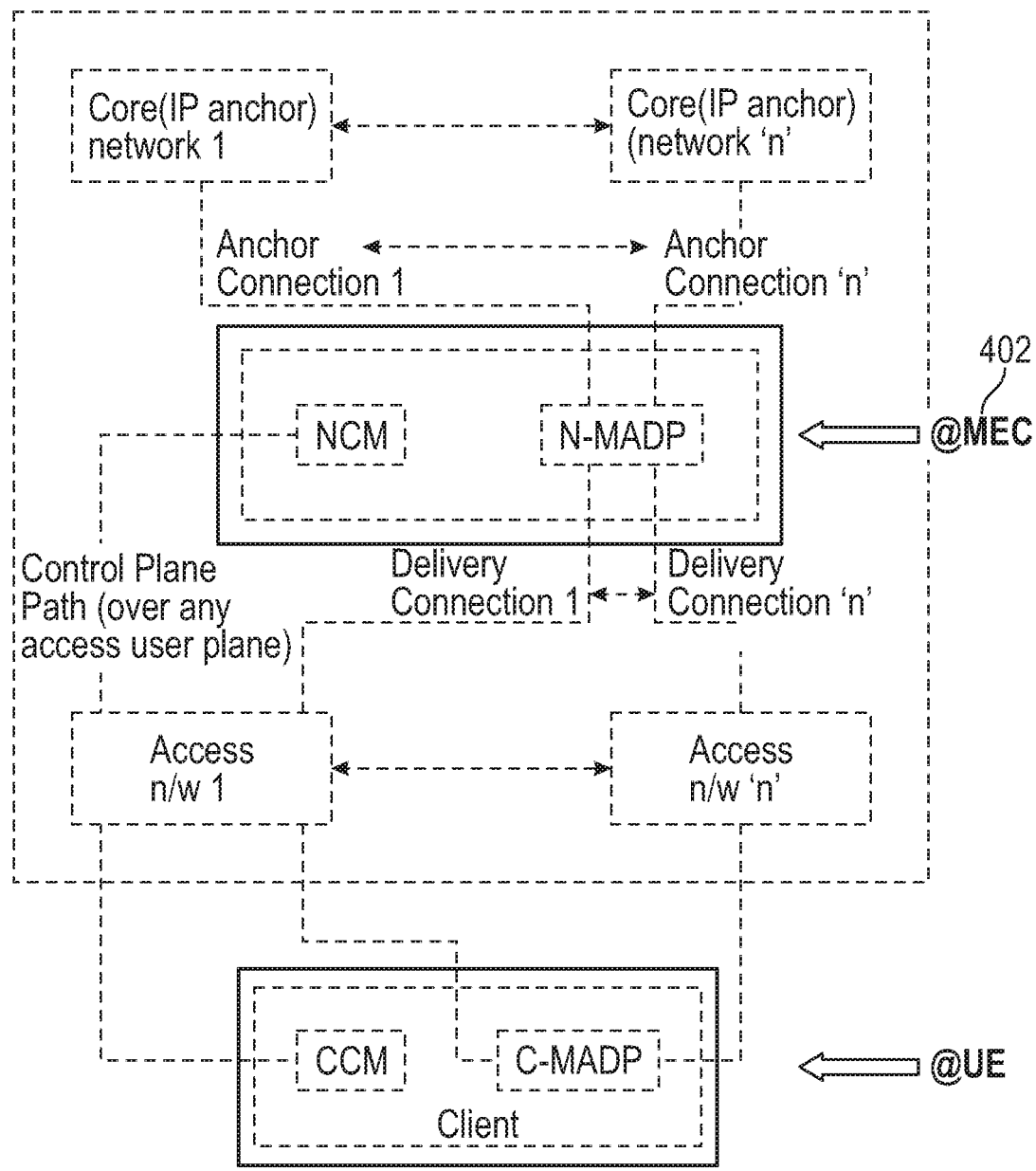
FIG. 4 depicts a block diagram of an enhanced MAMS framework referenced in FIG. 2.

FIG. 4 depicts a block diagram of an enhanced MAMS framework referenced in FIG. 2. As shown in FIG. 4, N-MADP will be part of the MEC platform 402. An MEC-based enhancement may introduce a new MEC MAMS API that may properly configure and manage multi-access traffic steering services of the MEC platform and may also expose information through an Mp1 reference point to MEC applications. This MEC enhancement may support link aggregation and path aggregation between WLAN and cellular (e.g. LTE) networks, or among multiple networks of any type (e.g., LTE, Wi-Fi, 5G, Ethernet, DSL, etc.), to efficiently manage the connectivity. This configuration also may allow the MAMS decisions to be made either by the MEC host or the MEC application.

Figure 5:
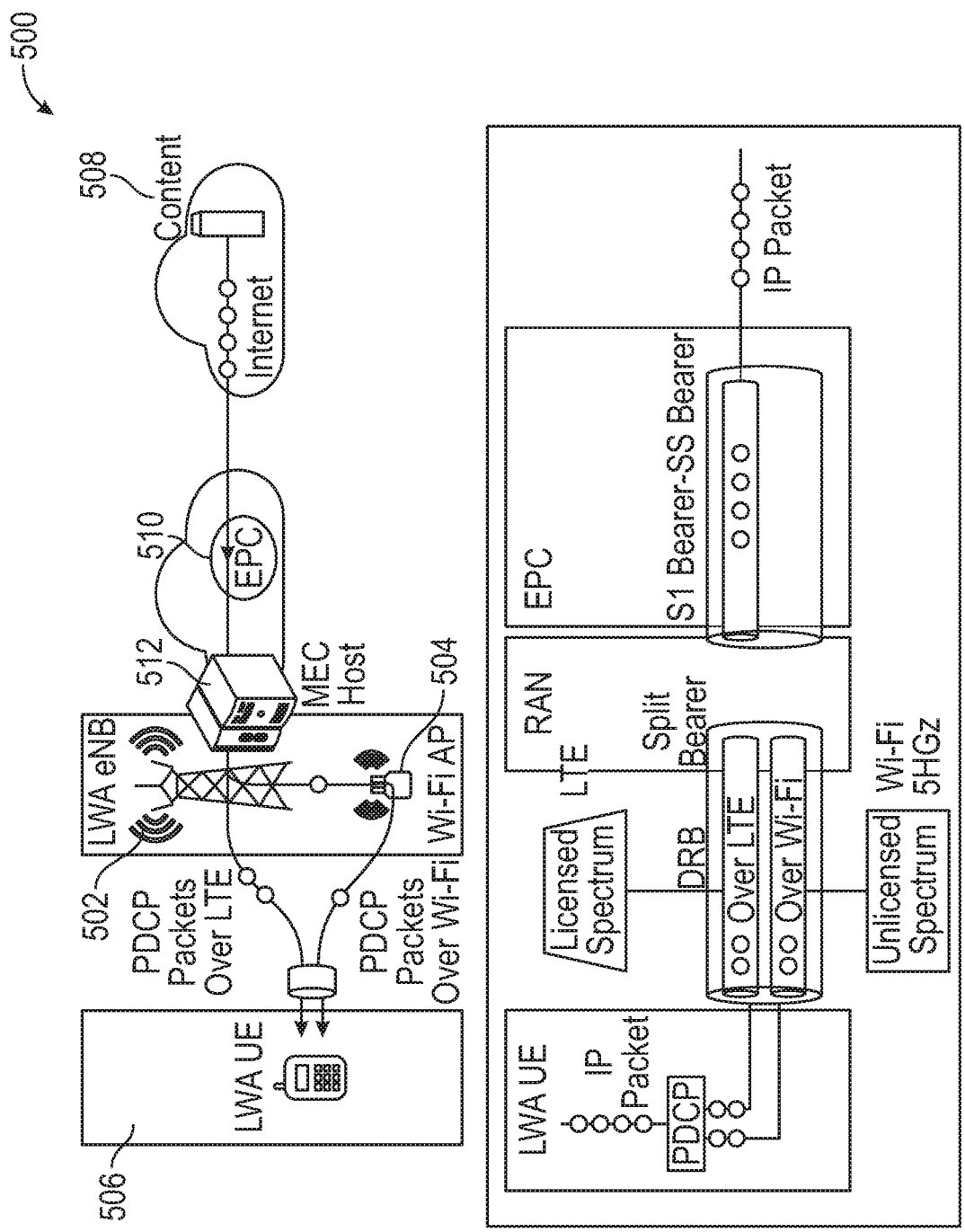
FIG. 5 depicts a block diagram of an example of an MEC system utilizing link aggregation, according to an example.

FIG. 5 depicts a block diagram of an example of an MEC utilizing link aggregation. For link aggregation with LWA, there may not be a need for further standardization in ETSI MEC. However, if LWA is not present (e.g., with LTE networks up to Rel. 12), ETSI MEC may be configured to support link aggregation. Thus, for a seamless support of link aggregation of WLAN and cellular networks, link aggregation should be realized by MEC (e.g., as used especially in absence of LWA).

LWA architecture includes LWA eNB 502, LWA-aware Wi-Fi AP 504 and LWA UE 506. LWA eNB 502 and Wi-Fi AP 504 can be collocated or non-collocated. If non-collocated, data is delivered through an IP tunnel (not shown in FIG. 5) between LWA eNB 502 and LWA-aware Wi-Fi AP 504.

Internet content 508 is received through the Evolved Packet Core (EPC) 510 at the MEC host 512. LWA eNB 502 performs scheduling for Packet Data Convergence Protocol (PDCP) packets on the PDCP layer and transmits some over LTE and others over Wi-Fi via Wi-Fi AP after encapsulating the packets in Wi-Fi frames. All the packets received, over either LTE or Wi-Fi, are then aggregated at the PDCP layer of the LWA UE 506. Wi-Fi APs 504 are connected to LWA eNBs 502, and report information on channel conditions to the LWA eNB 502, which then determines whether to have the Wi-Fi APs 504 work for LWA purposes based on the information reported. LWA eNB 502 can improve LTE performance by managing radio resources in real time according to the RF and load conditions of both LTE and Wi-Fi. A Wi-Fi AP 504 can work as a native Wi-Fi AP while not serving LWA purposes. The bottom half of FIG. 5 illustrates more details of EPC bearers and bearer splitting.

Figure 6:
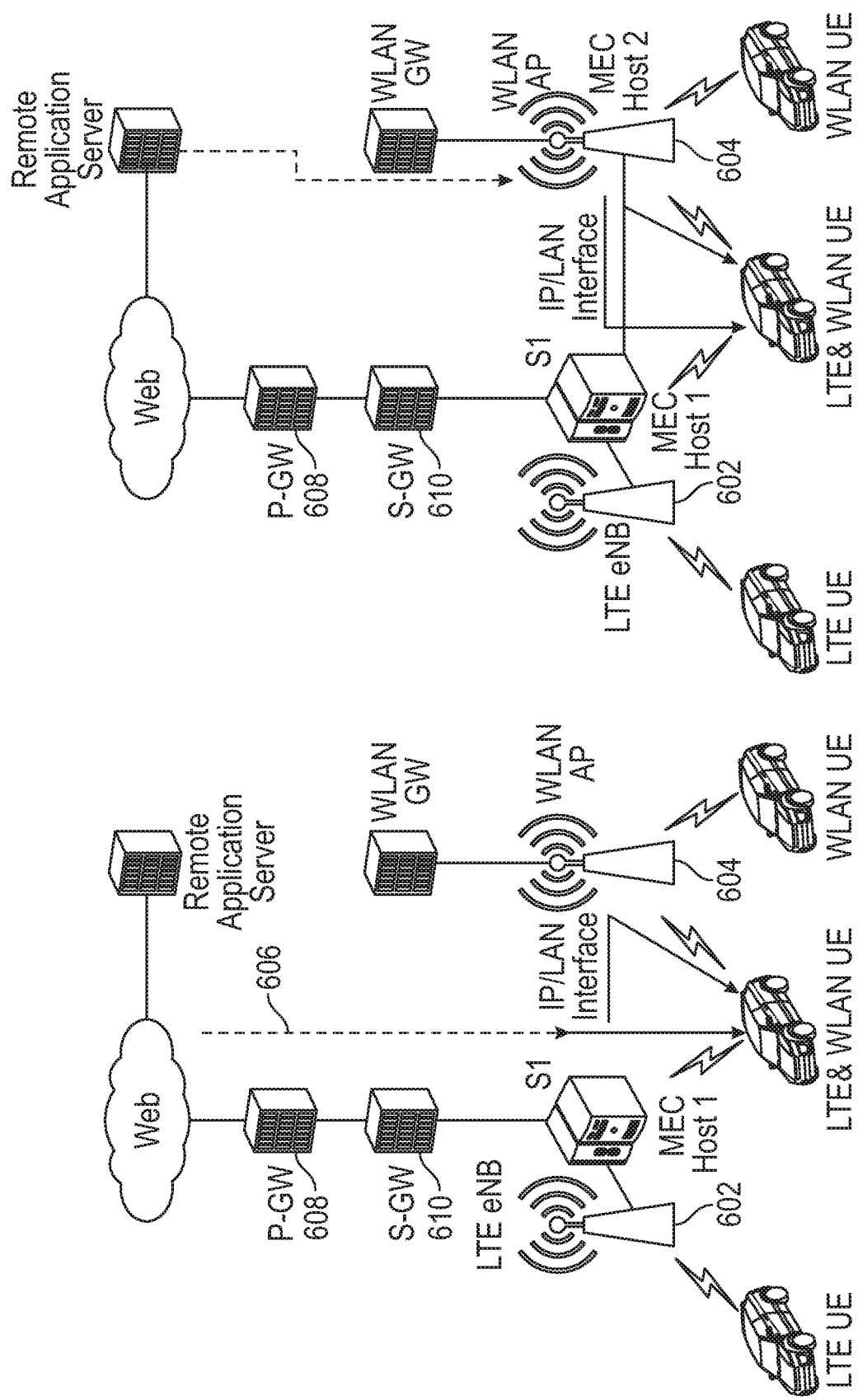
FIG. 6 includes a block diagram of an example of link aggregation with a MEC system using cellular anchored traffic and Wi-Fi anchored traffic, according to an example.

FIG. 6 includes a block diagram of an example of link aggregation with MEC using cellular anchored traffic and Wi-Fi anchored traffic. Specifically, FIG. 6 depicts a multi-RAT scenario, with multiple MEC hosts, deployed for each RAT (e.g., with MEC host 1 collocated with eNB 602 and MEC host 2 collocated with WLAN AP 604). For cellular-anchored traffic (left side of FIG. 6), traffic 606 arrives via Packet Data Network Gateway (P-GW) 608 and Serving Gateway (S-GW) 610 at MEC host 1. MEC host 1 may connect to WLAN AP 604 via a simple IP/LAN interface and run as a normal Proxy server that will terminate all MAMS data-plane tunnels (further described with respect to FIG. 7 below) over WLAN. No MEC support is needed on the WLAN AP 604. For Wi-Fi anchored traffic (right side of FIG. 6), the MEC host 1 may use the "Local Breakout" feature to route all MAMS data-plane tunnels (via cellular) to MEC host 2. MEC support is needed on both LTE and WLAN for Wi-Fi anchored traffic.

Figure 7:
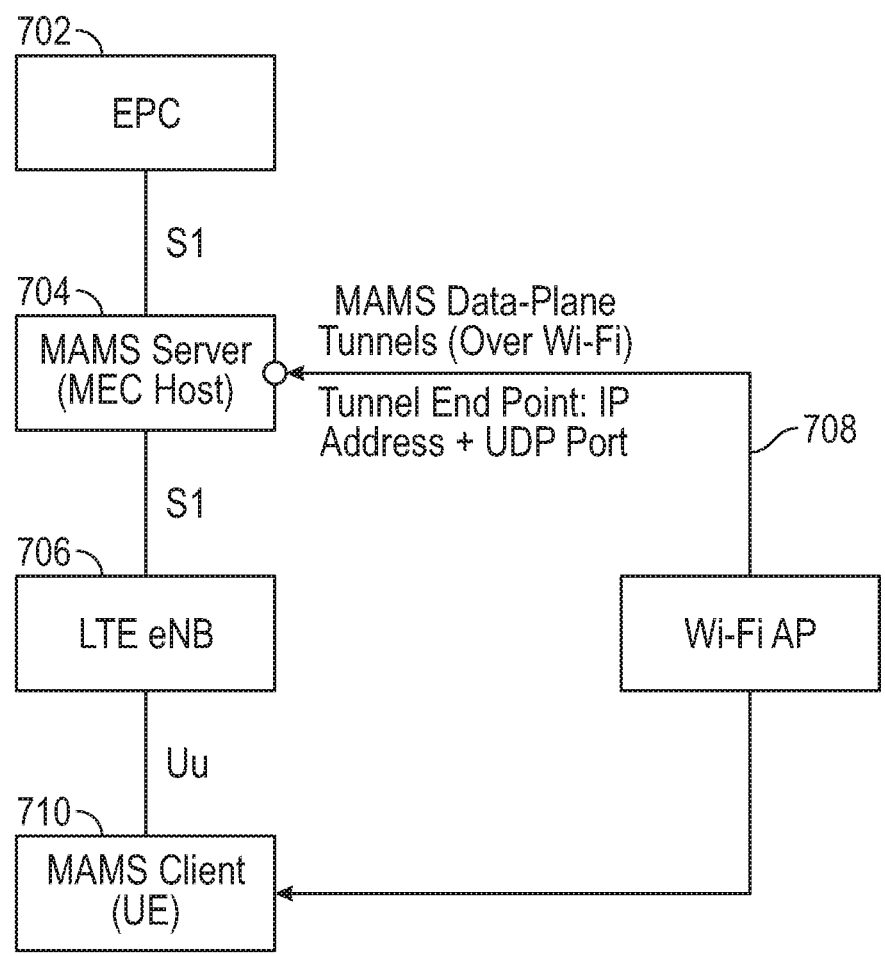
FIG. 7 includes a block diagram an example of a MAMS data plane tunnel, according to an example.

FIG. 7 includes a block diagram an example of a MAMS data plane tunnel. The EPC 702 is IP-based core network infrastructure that provides packet data services to support convergence according to embodiments described herein. EPC 702 connects via SI to a MAMS server 704. The MAMS server 704 may communicate the N-MADP Tunnel End Point information (IP address+User Datagram Protocol (UDP) port number) to the MAMS client 710 using the MAMS control-plane messages. The MAMS client may then establish a UDP connection (assuming UDP tunneling) with the MAMS server 704 via the Wi-Fi path 708. From the Wi-Fi perspective, this provides normal UDP traffic, and the MAMS server 704 runs as a UDP server on the Wi-Fi network.

Figure 8:
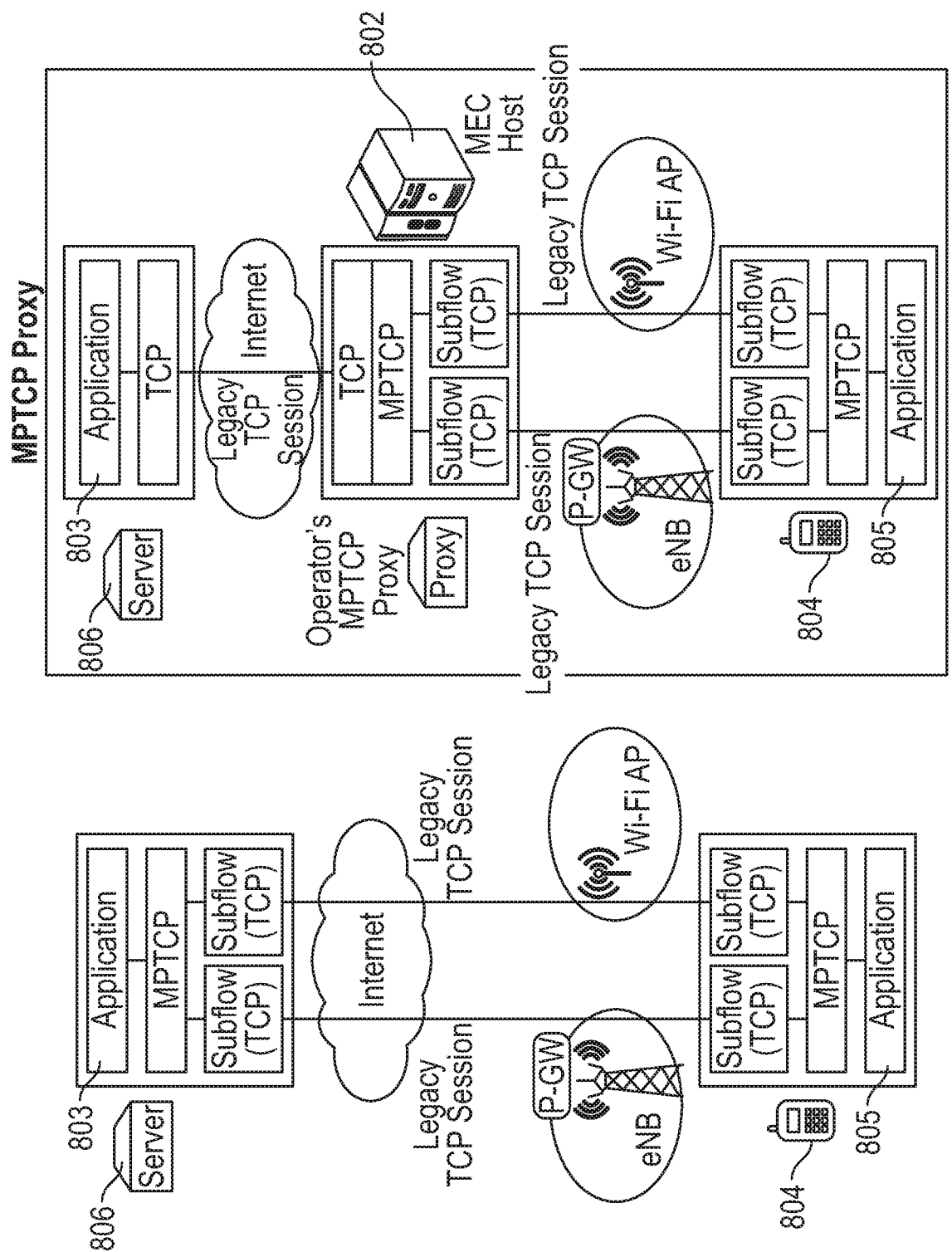
FIG. 8 depicts a block diagram of an example of a MEC system supporting path aggregation, according to an example.

FIG. 8 depicts a block diagram of an example of a MEC system 802 supporting path aggregation. The left side of FIG. 8 illustrates communication between an application 803 running on a server 806 and an application 805 running on a UE 804 without path aggregation. The right side of FIG. 8 illustrates such communication with path aggregation. MAMS may be configured to support multiple mechanisms for path aggregation (e.g. Multi-path Transmission Control Protocol (MPTCP), non-multi-path TCP, or other solutions supporting all traffic, such as Trailer-based MX Convergence Sublayer) based on the techniques discussed herein. MPTCP aggregation is illustrated in FIG. 8. In the case of LTE-Wi-Fi aggregation, aggregation takes place at the radio link level. However, aggregation takes place at the TCP level in case of MPTCP Proxy-based LTE-Wi-Fi aggregation solutions shown on the right side of FIG. 8.

As illustrated in FIG. 8, in MPTCP Proxy-based LTE-Wi-Fi aggregation, data is transmitted using as many paths as possible while still working with the existent Internet environment in a stable way, without causing any changes in existing Internet infrastructure or applications. For this purpose, the TCP protocol, a transport layer protocol, was extended to MPTCP. Legacy TCP uses only one path even when there is more than one path between the UE 804 and server 806. On the other hand, MPTCP can establish multiple paths, and send data through them concurrently.

Many MAMS deployments may only partially cover all protocols and are not well supported by all network devices, in many cases, because the market is still fragmented. Thus, a proper interoperable solution for the multi-access convergence for both link aggregation and path aggregation may be managed at the application level by the MEC system 802, using configurations in accordance with embodiments. With the configuration described herein with respect to various embodiments, ETSI MEC support for MAMS is agnostic of the mechanisms for path aggregation.

Figure 9:
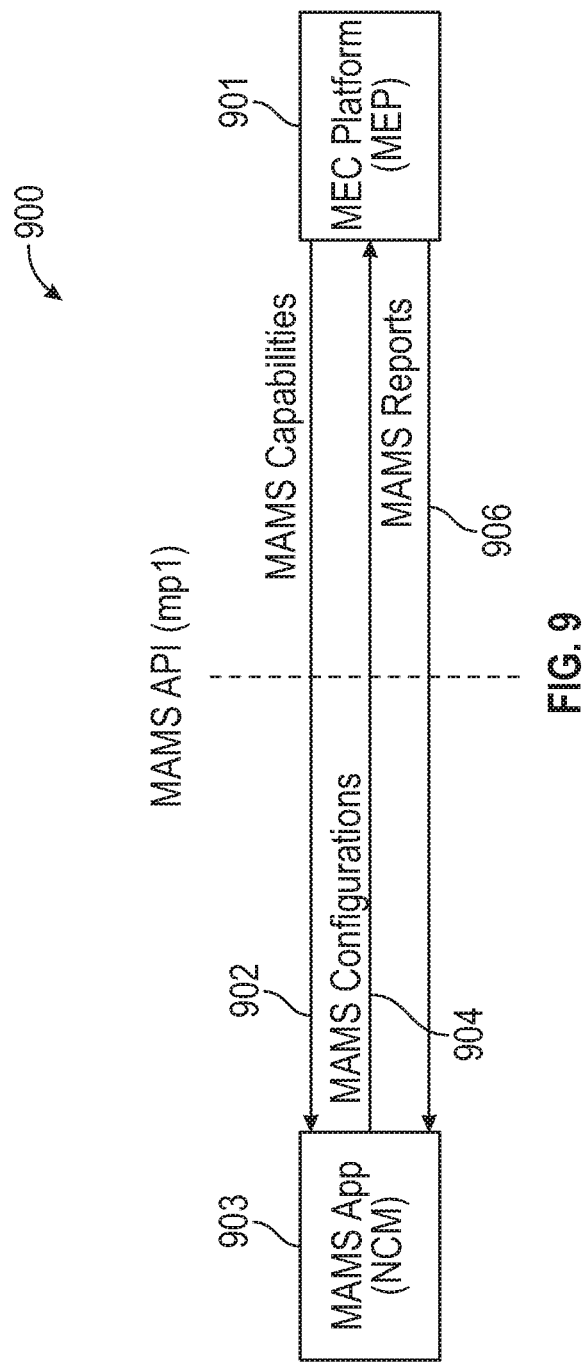
FIG. 9 includes an example of a MAMS/MEC session establishment work flow, according to an example.

FIG. 9 provides an example of a MAMS/MEC session establishment workflow 900 according to some embodiments. Messages are passed between the MEC platform (MEP) 901 and NCM (MAMS application) 903 running on top of the MEC platform. A MEC MAMS API may produce information that is available for MEC applications (e.g., MAMS application 903), and possibly also other MAMS APIs in the system, or in different MEC systems. The MEC MAMS API may be part of a traffic management API. The information may also be exposed (e.g., through the MEC service registry) to MEC applications instantiated both in the same MEC host and other MEC hosts, such as hosts belonging to the same or other MEC systems.

In an example, MAMS Capabilities message 902 may provide information on:
  Supported features: downlink or uplink multi-path/link aggregation, lossless switching, etc.
  Supported convergence methods: MP-TCP Proxy, GRE Proxy, and Trailer-based MX convergence (GMA)
  Supported adaptation methods: UDP without DTLS, UDP with DTLS, IPSec, and Client NAT
  Supported connections: LTE, Wi-Fi, 5G, etc.
  For each supported connection, the following information may be included:
  Conn ID, Type (LTE, Wi-Fi, 5G, etc.)
  N-MADP Tunnel Endpoint IP address (if Delivery Connection is supported)
  Delivery/Anchor Connection Supported (Yes or No)
  MAMS Configurations message 904 may include:
  User plane (UP) configurations: Conn ID, Convergence/ Adaptation method, N-MADP Tunnel Endpoint Parameters (e.g. IP address, UDP port)
  (UE-specific) Traffic Steering configurations: UE ID, Flow ID (Conn ID+Traffic Class ID), DL/UL, Traffic Flow Template (TFT), Traffic Splitting Parameters (e.g. x % over LTE, or s1 every s2 packets over LTE)
  MAMS Report/Statistics message 906 may include:
  (UE-specific) UP Measurements: UE ID, Uplink throughput, Uplink packet loss, Downlink throughput, Traffic Load distribution (e.g. x % DL traffic over LTE, y % UL traffic over LTE, etc.)

Figure 10:
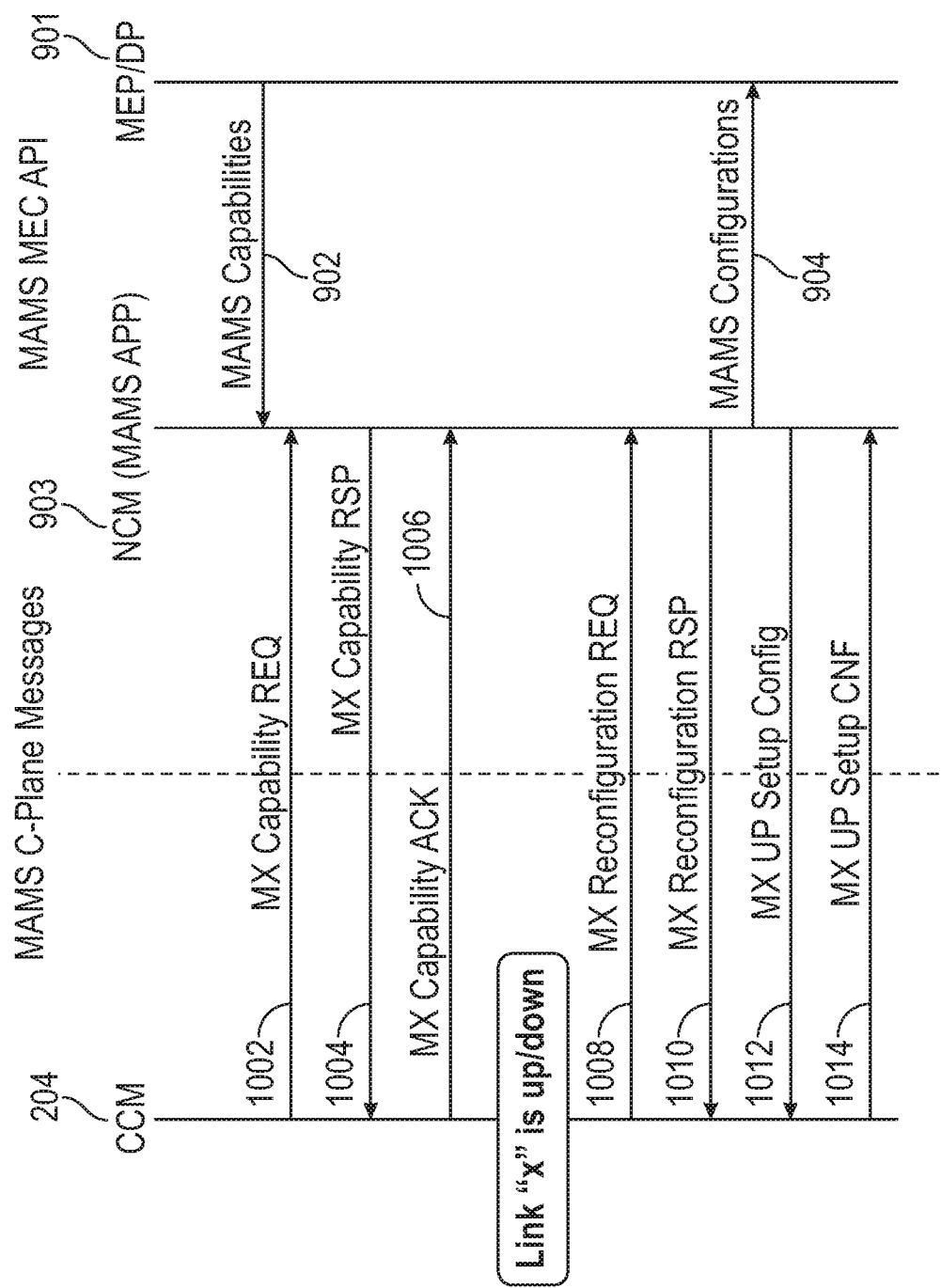
FIG. 10 includes a further example of a MAMS/MEC session establishment work flow, according to an example.

FIG. 10 includes a further example of a MAMS/MEC session establishment work flow, according to an example. FIG. 10 illustrates standard MAMS control-plane messages that can occur in addition to the messages described with respect to FIG. 9. For example, the CCM 204 can transmit a MX Capability REQ message 1002 that can include 1.) a feature activation list indicating whether a feature (e.g., lossless switching, fragmentation, concatenation, Uplink aggregation, Downlink aggregation, Measurement, probing, etc.) is supported; 2.) information on anchor connections (e.g., connection ID and type); 3.) information on delivery connections (e.g., connection ID and type); 4.) list of convergence methods supported (e.g., GMA, MPTCP Proxy, GRE Proxy, etc.); and 5.) list of adaptation methods supported (e.g., UDP Tunnel without DTLS, UDP Tunnel with DTLS, IPsec Tunnel, etc.). The NCM 903 can provide a MX Capability RSP message 1004, and the CCM 204 can acknowledge this with a MX Capability ACK 1006.

If the CCM 204 detects changes in a link status or that the IP address has changed (via, for example, APIs provided by the client operating system), the CCM 204 can transmit a MX Reconfiguration REQ message 1008 to set up, release or update the connection. The NCM 903 will provide a response message 1010. MX UP Setup Config message 1012 is transmitted by NCM 903 to configure user plane protocols and MX UP Setup CNF message 1014 is transmitted to inform the NCM 903 that user plane protocols have been configured.

Figure 11:
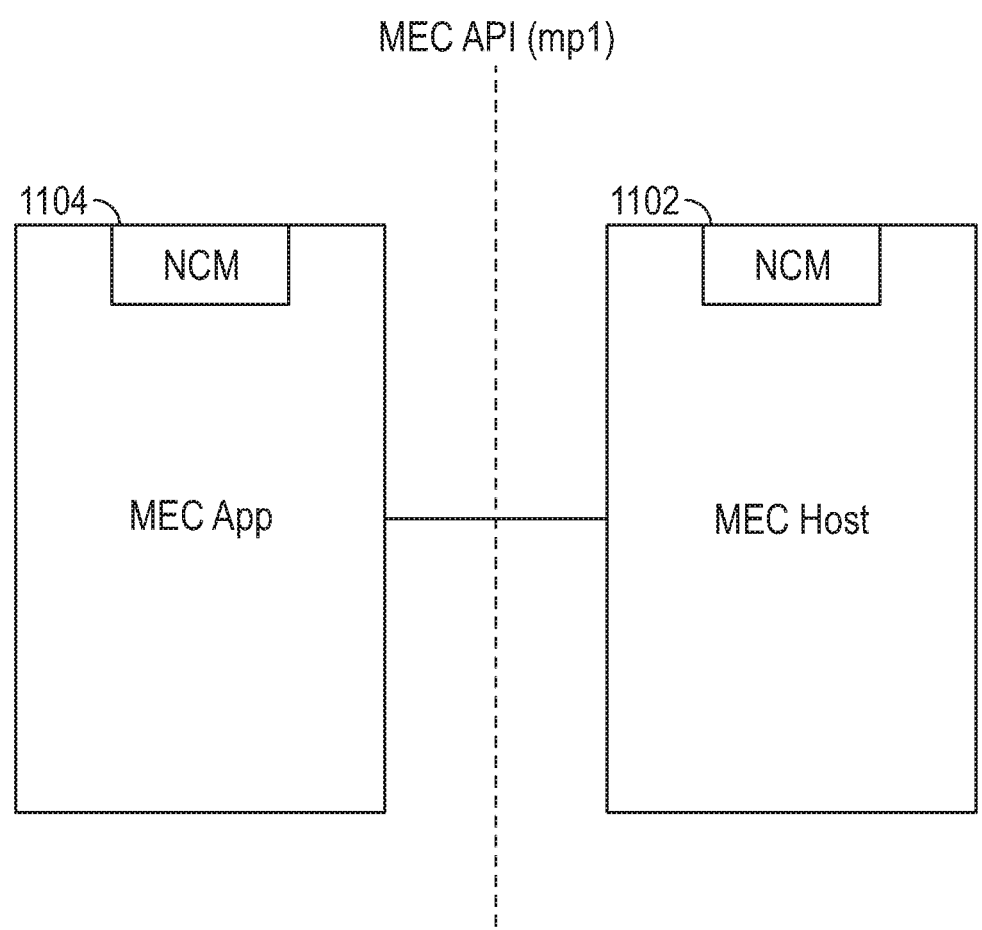
FIG. 11 depicts a block diagram of an MEC application programming interface (API), according to an example.

FIG. 11 depicts a block diagram of an MEC application programming interface (API). In an example the MAMS decision may be made by MEC host 1102, when NCM functionality is implemented on the MEC host 1102. In another example, the MAMS decision is made by MEC App 1104. Either option may be enhanced in the MEC Data Plane with addition of the MAMS U-plane (see FIG. 12 and FIG. 13 for further description of the MAMS U-plane).

Figure 12:
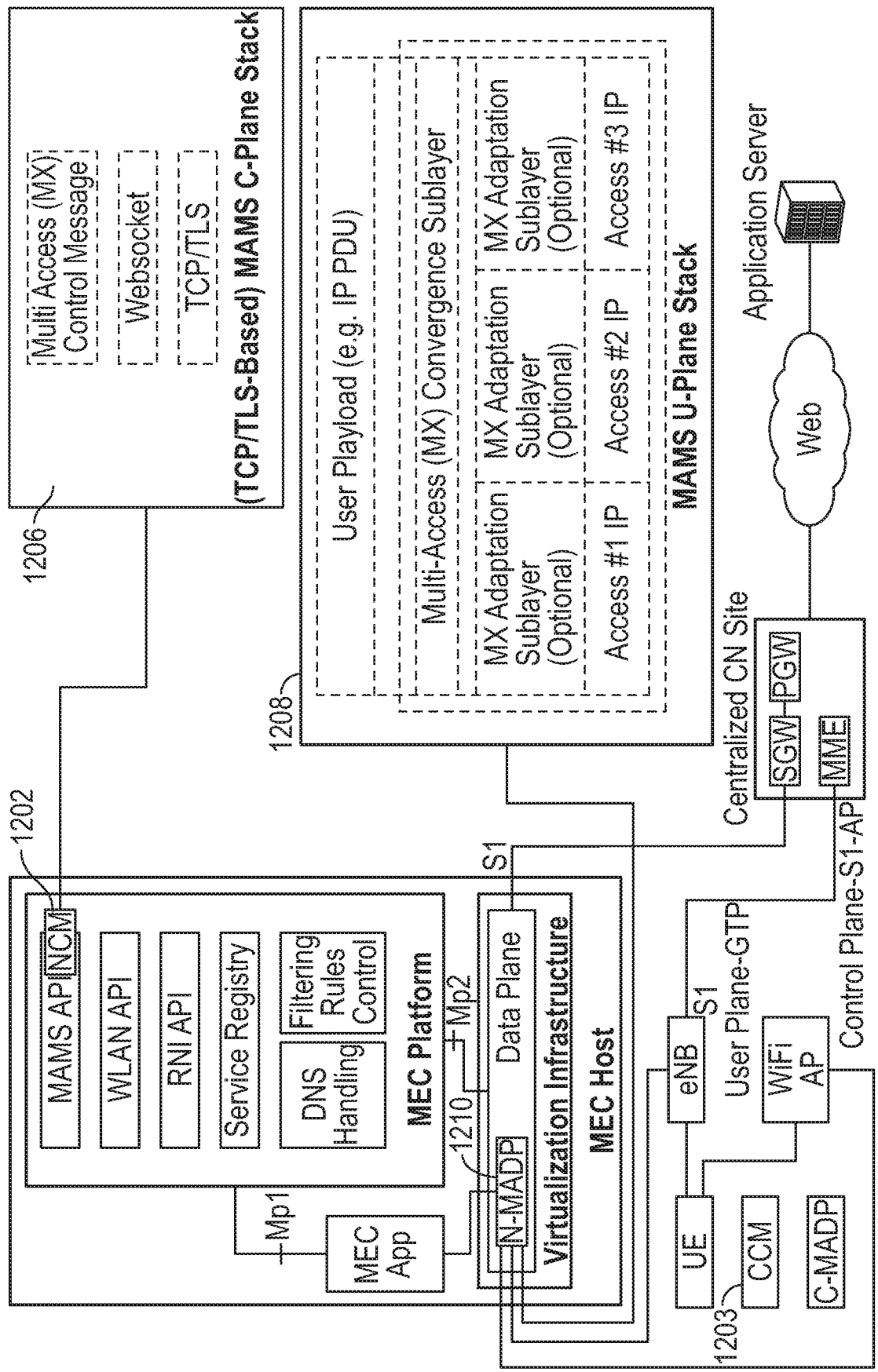
FIG. 12 includes a block diagram for an example of a MAMS API using a network connection manager (NCM), according to an example.
Figure 13:
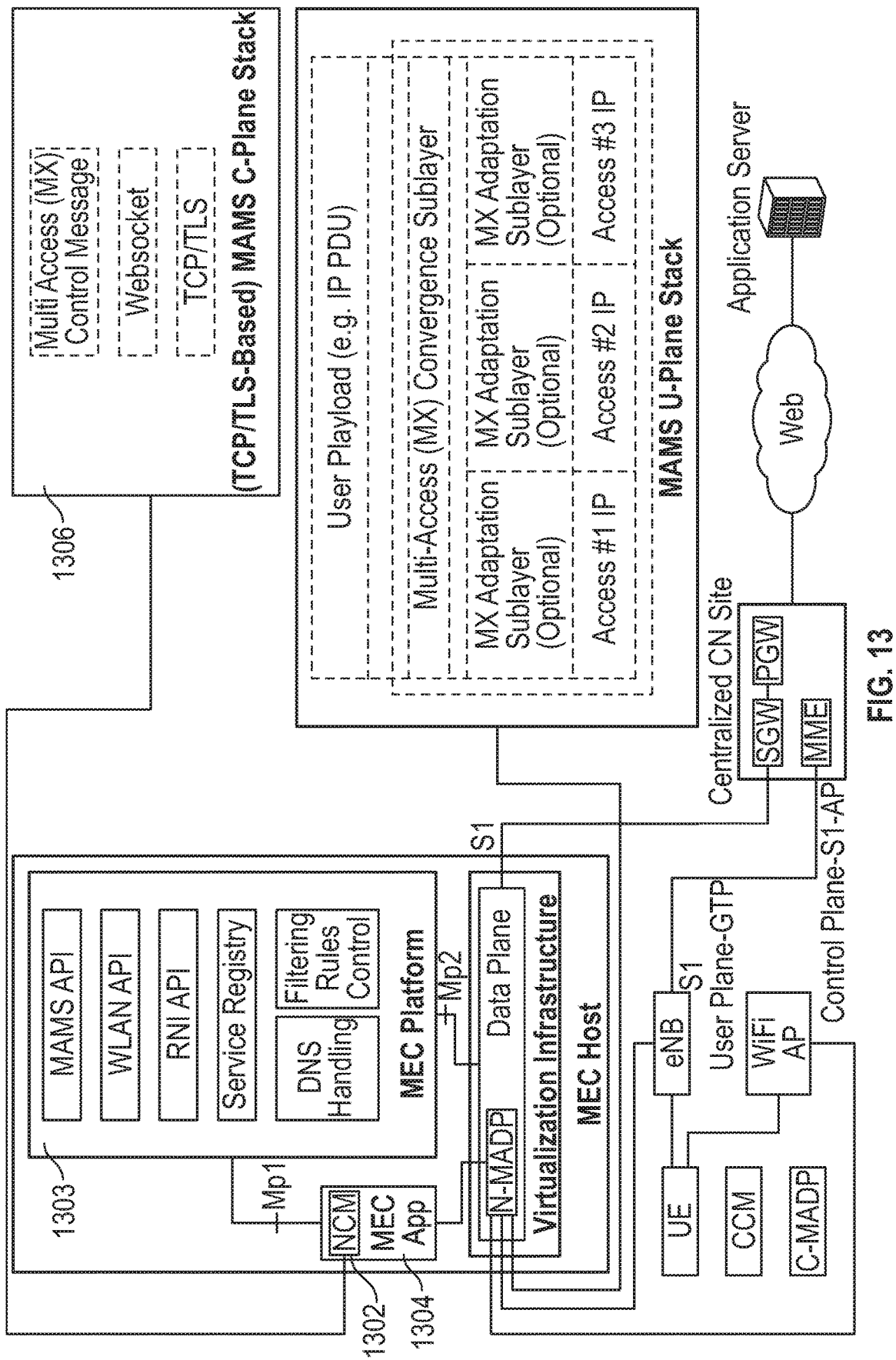
FIG. 13 includes a block diagram for a further example of a MAMS API using a network connection manager (NCM), according to an example.

FIGS. 12 and 13 illustrates two example embodiments for supporting the MAMS control plane in reaching a traffic steering decision (i.e., by either using or not using the Mp1 reference point). In the example embodiment illustrated in FIG. 12, the NCM component 1202 is implemented at the MEC host and is not included in the MEC application. Therefore, the MEC host manages the control plane stack 1206. There is no impact to the Mp1 reference point. The control plane stack 1206 can include a multi-access (MX) control message and WebSocket for transporting management and control messages between NCM 1202 and CCM 1203, which were described in further detail with respect to FIG. 2 earlier herein. The MAMS U-Plane protocol stack 1208 is managed by N-MADP 1210 and can include two sublayers: 1.) the Multi-Access (MX) Convergence Sublayer to perform multi-access specific tasks such as path selection and aggregation, splitting or reordering, lossless switching, fragmentation, etc.; and 2.) optional Multi-Access (MX) Adaption Sublayer/s to handle tunneling, network layer security, etc.

In FIG. 13, in contrast to FIG. 12, the NCM component 1302 is included in the MEC application 1304 and therefore implement outside the MEC platform 1303. In the embodiment of FIG. 13, the MEC application 1304 may manage the control plane stack 1306 and communicate with the MAMS feature in the MEC platform 1303 over the Mp1 interface using the MAMS API described earlier herein with reference to FIG. 9. This may provide the opportunity to expose information to higher level functionalities (e.g. to leave application developers the freedom to implement C-plane functionalities as part of the MEC application) and may enable application developers to derive customized triggers for the multi-RAT aggregation. Control-plane/data plane separation is achievable in which the data plane is part of the MEC platform and programmable through the Mp1 interface.

MEC-Based Multi-Access Convergence in Mobility Scenarios

In the following description, methods, configurations, and related apparatuses are disclosed for a MEC based system to realize a cross-layer, multi-access convergence at application level. This convergence can be used to provide guidance to a MAMS gateway by use of specific information exposed or collected by the ETSI MEC API. For instance, the following discusses information (e.g., radio cellular network, WLAN, UE location and radio bandwidth (BW) data) that is collected respectively via a standardized radio network information (RNI) API, WLAN API, Location API and BW Management API. The following examples also may introduce enhancements on the Mp3 reference point of the ETSI MEC reference architecture, in order to enable proper connectivity switching to be triggered in MAMS, resulting in data traffic steering among different RATs.

As an example of conventional techniques, the ETSI MEC-002 Group Specification (GS) as well as the ETSI MEC-018 Group Report (GR) on end-to-end mobility focus on limited use cases relevant to application mobility or smart relocation. These GRs/GSs also provide associated requirements for a MEC system to relocate an application instance and/or context to the proper target MEC host for performance optimization. However, these approaches focus on single RAT implementations (e.g., in a cellular 3GPP radio access network). As a result, current approaches have not taken into account the MAMS framework for SSC enhancing MEC mobility when two or more RATs are considered.

With the present techniques and configurations, SSC enhancing inter-RAT mobility in the existence of multi-RAT deployments overlaid by MEC infrastructure may emphasize the usefulness of MEC technology, while addressing performance requirements of vertical industries such as the vehicular and the industrial automation vertical segments. The information of the source-RAT may be interfaced to a MEC host co-located with a radio node of the target-RAT as soon as the UE enters the coverage area of the radio node of the target-RAT (e.g., before a radio handover procedure terminates). To achieve seamless MAMS session mobility, UE MAMS contextual information and state machines may be transferred from the source MEC host to the target MEC host.

The present techniques and configurations may be utilized in connection with many aspects of current networking systems, but are provided with reference to IoT, MEC, and NFV deployments. The present techniques and configurations specifically may be (but are not required to be) relevant to the standards and approaches published in ETSI GS MEC-003 "Mobile Edge Computing (MEC); Framework and Reference Architecture" (e.g., V2.0.3); ETSI GS NFV-SEC 013 "Network Functions Virtualisation (NFV) Release 3; Security: Security Management and Monitoring" (e.g., v. 3.1.1) and related MEC, NFV, or networked operational implementations. However, while the present techniques and configurations may provide significant benefits to MEC architectures and other IoT device network architectures, the applicability of the present techniques and configurations may be extended to any number of edge computing devices or fog computing platforms.

In the context of a deployed system (such as the MEC system depicted in FIG. 3, or a two-RAT system as discussed in FIG. 1) the present techniques and configurations provide a system in which a WLAN AP is co-located with a first MEC host (Host 1) (e.g., forming a private/enterprise network), but may also be accessible by a second MEC host (Host 2). In the vicinity of the enterprise network, an LTE eNB may be directly interfaced to MEC host 2. A remote application server providing data may be located in the remote cloud. A dual-radio UE may be within the coverage area of the private network.

Figure 14:
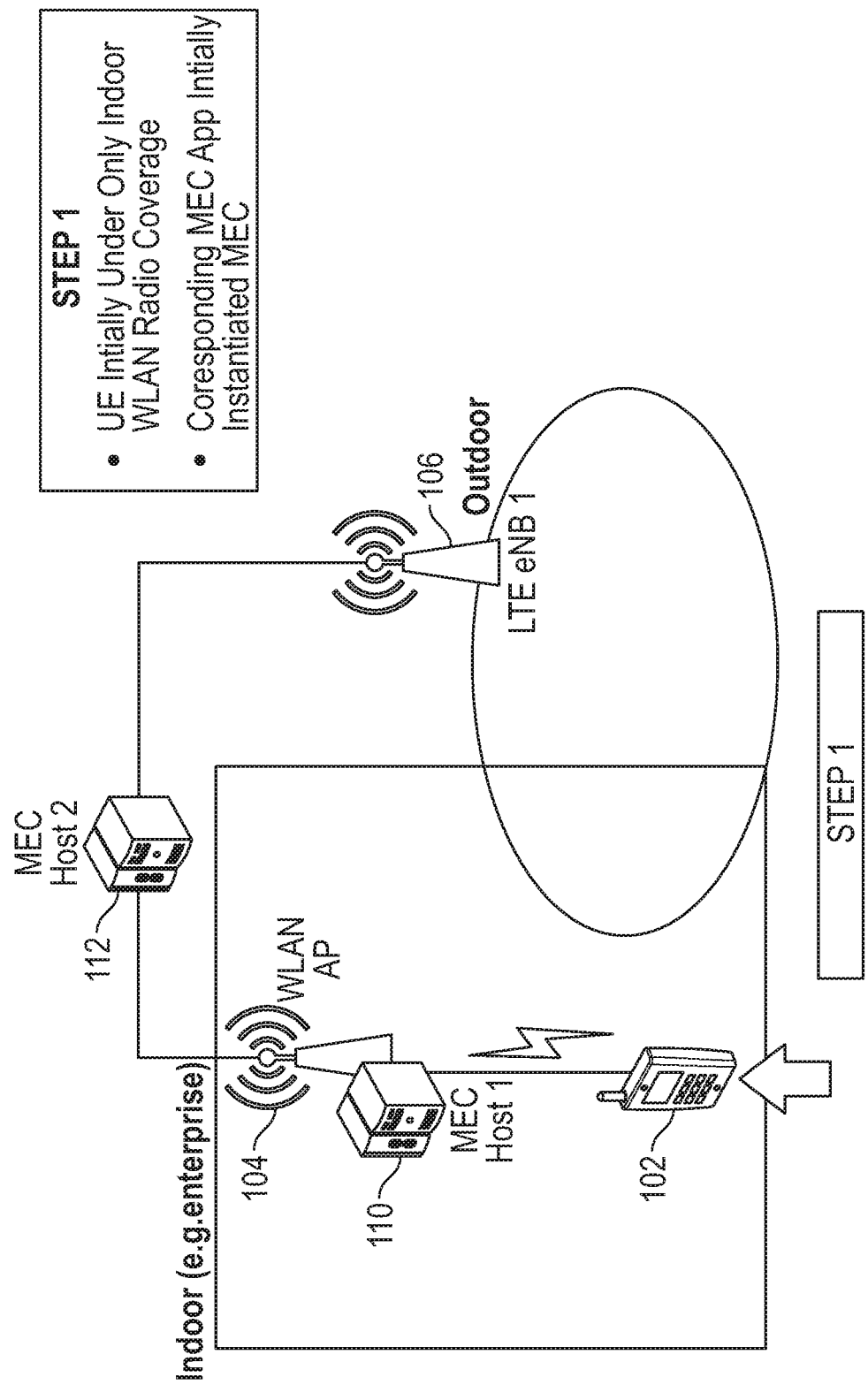
FIG. 14 includes a block diagram of a two-RAT system in which the user equipment (UE) is under radio coverage of both RATs, and the MEC app is instantiated by a MEC host, according to an example.
Figure 16:
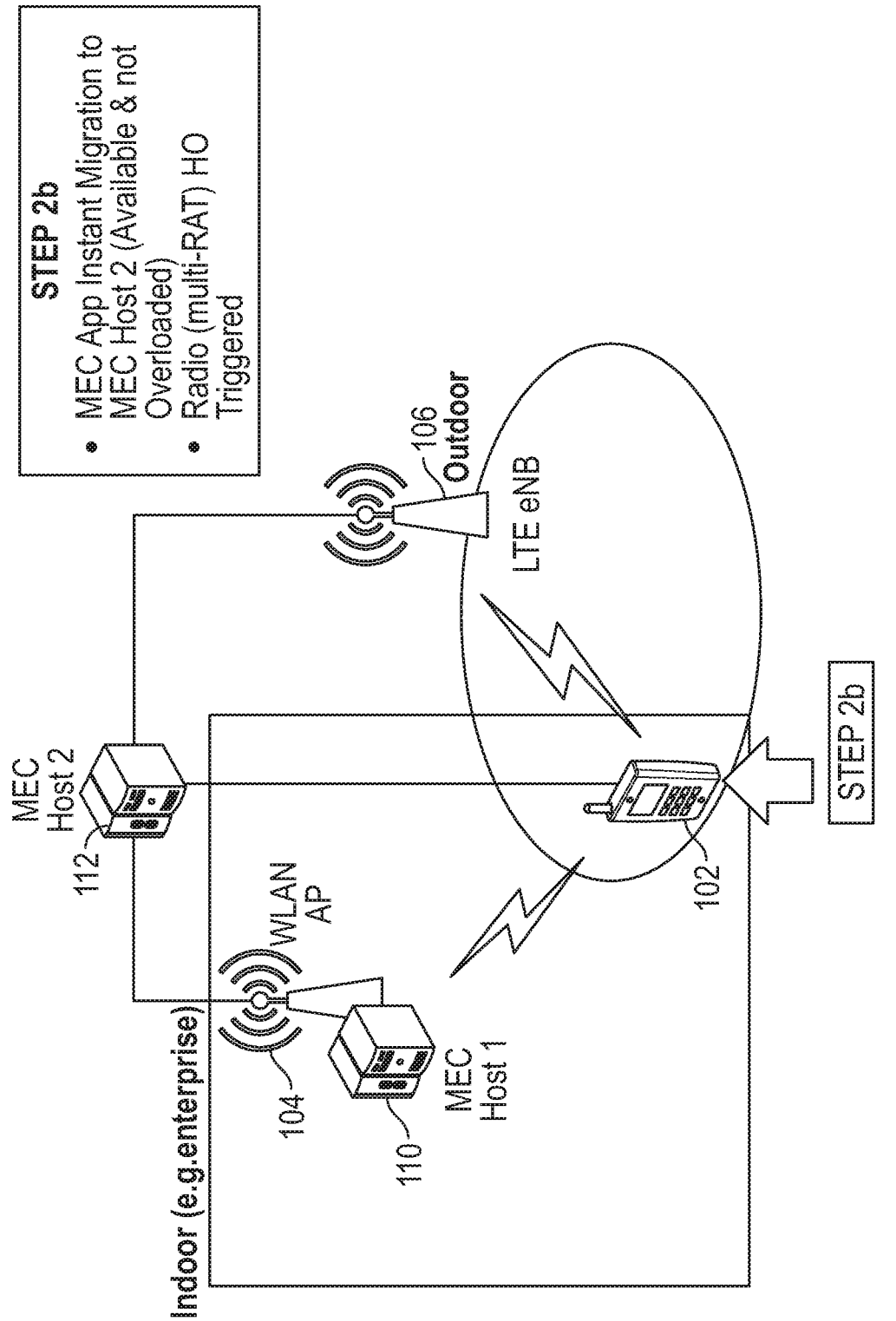
FIG. 16 depicts a block diagram of a two-RAT system in which the (UE) is under radio coverage of both RATs, and the MEC undergoes instant migration prior to radio handover, according to an example.
Figure 17:
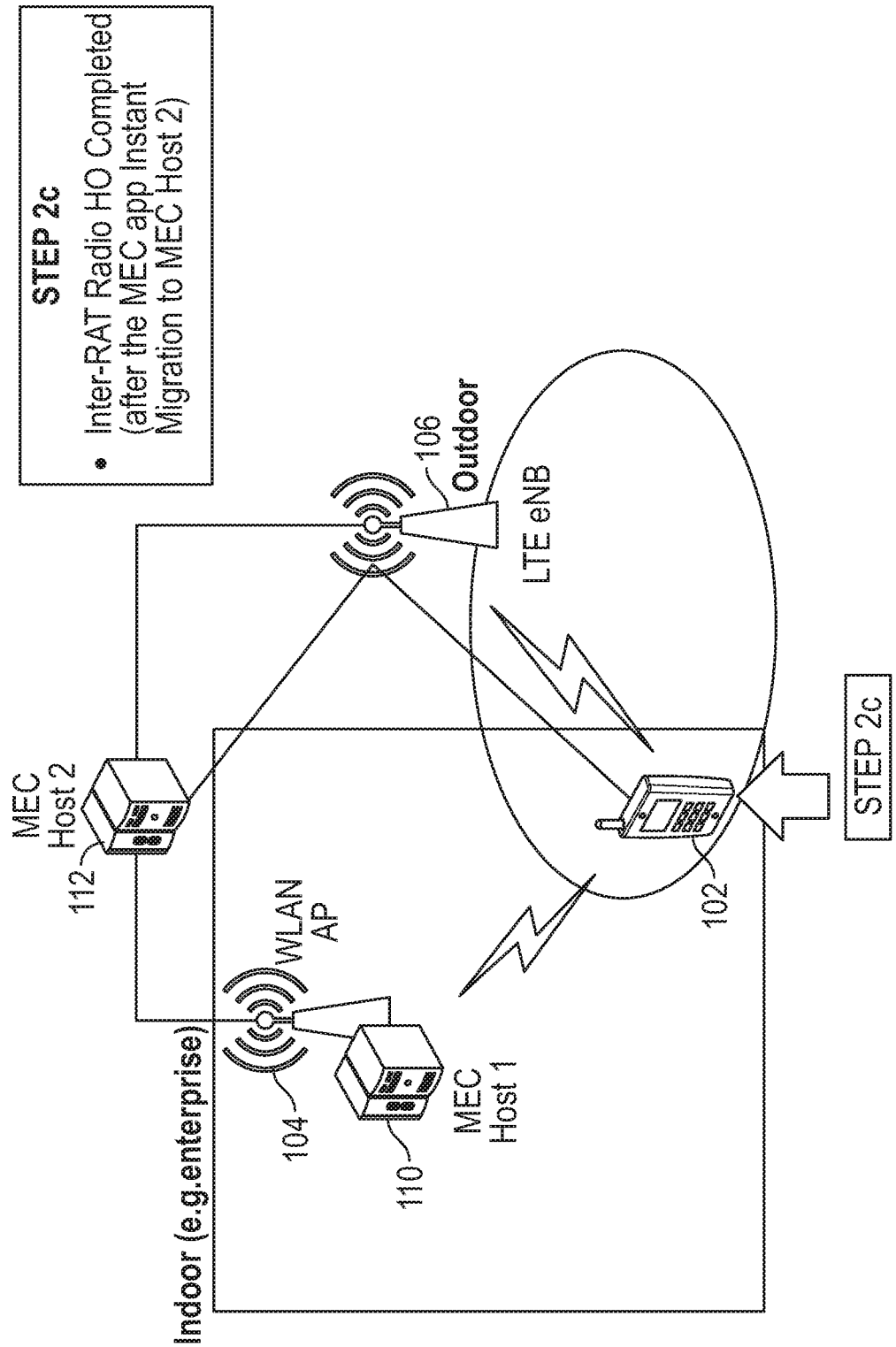
FIG. 17 depicts a block diagram of a two-RAT system in which inter-RAT radio handover has been completed after a MEC app instant migration, according to an example.

Referring to FIG. 14, as the UE 102 moves towards the vicinity of the LTE eNB 106 (e.g., from an indoor or enterprise location to an outdoor location), an important concern is on MEC application instant migration and radio handover exploiting the MAMS framework, and the available RNI, WLAN, UE location and BW information available at the two hosts MEC host 1 110 and MEC host 2 112. The scenario is depicted in FIG. 15, FIG. 16, and FIG. 17.

Figure 15:
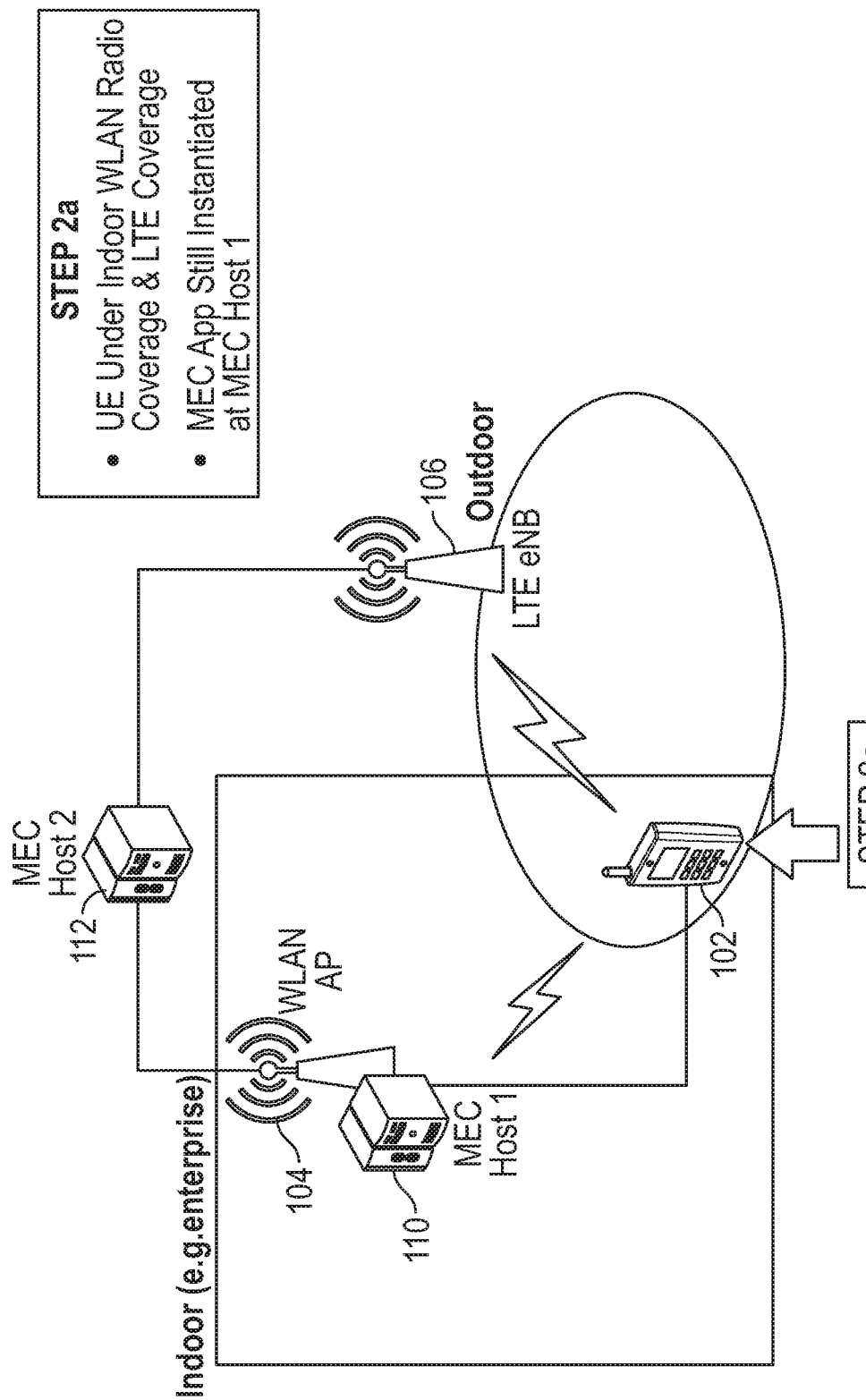
FIG. 15 includes a block diagram of a two-RAT system in which the user equipment (UE) is under radio coverage of both RATs, and the MEC app is instantiated by a MEC host, according to an example.

FIG. 15 includes a block diagram of a two-RAT system in which the UE 102 is under radio coverage of both RATs, and the MEC application is still instantiated at MEC host 1 110. FIG. 16 depicts a block diagram of a two-RAT system in which the UE 102 is under radio coverage of both RATs, and the MEC undergoes instant migration from MEC Host 1 110 to MEC Host 2 112 prior to radio handover. FIG. 17 depicts a block diagram of a two-RAT system in which inter RAT radio handover has been completed after the MEC application instant migration.

The above illustrated procedure may be performed based on obtaining and exchanging information (for example, RNI, WLAN, UE location, BW management) to be exploited by a MAMS service for triggering the radio node re-selection and, consequently, the traffic steering at the application level.

Figure 18:
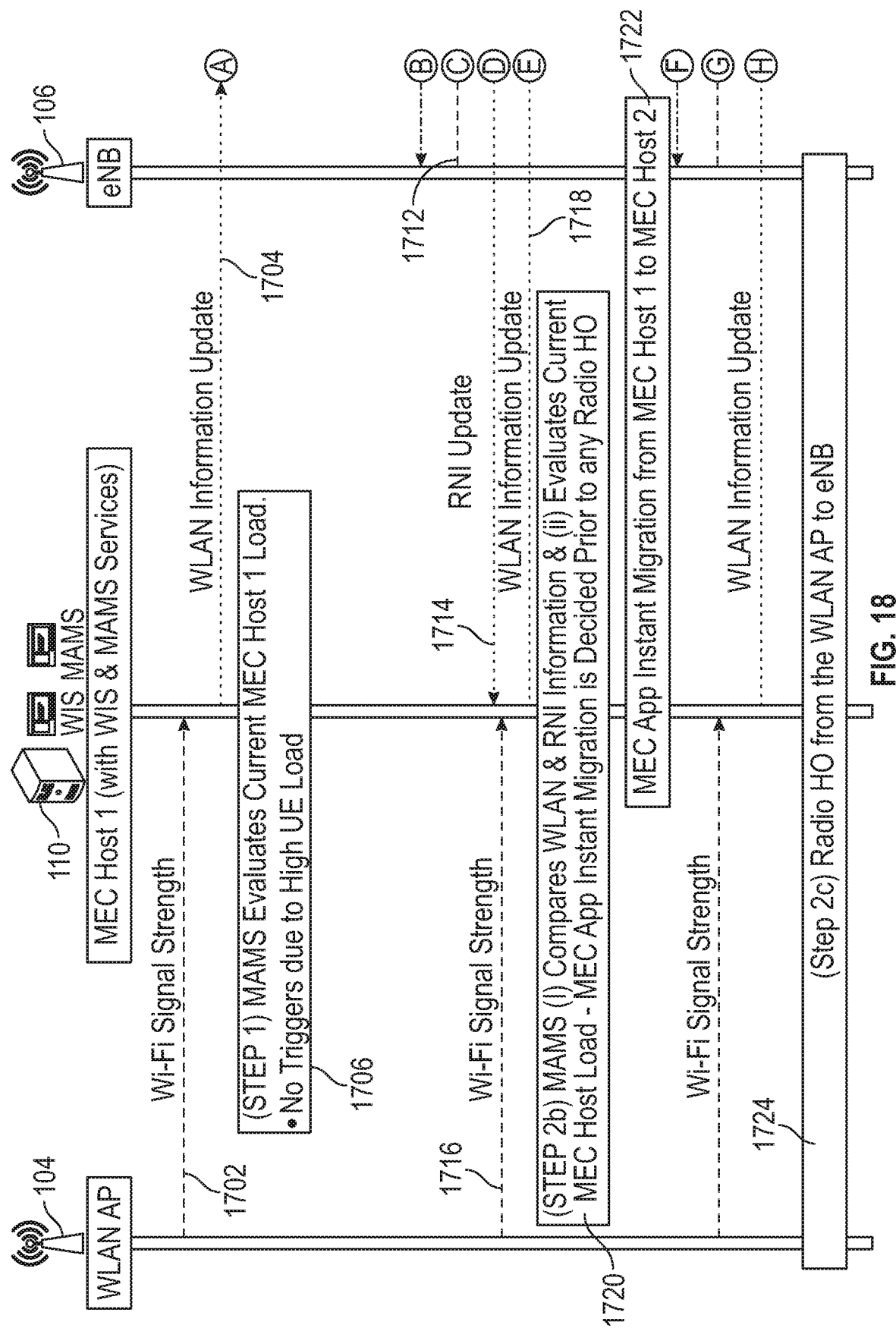
FIG. 18 depicts a message sequence flowchart of a session and service continuity (SSC) enhancing method for a cross layer, multi-access convergence at the application level, according to an example.
Figure 18:
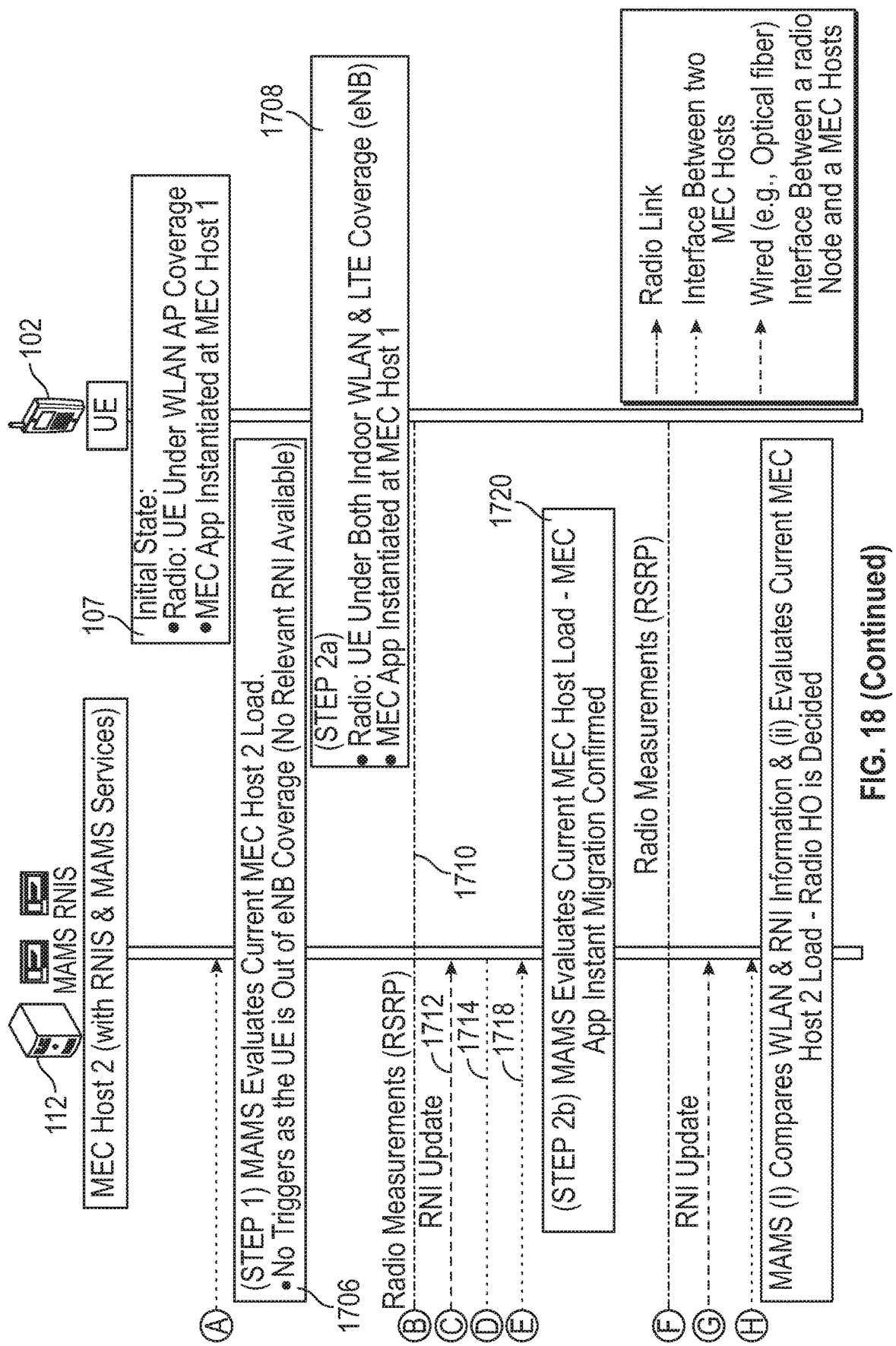

FIG. 18 depicts a message sequence flowchart of the session and service continuity (SSC) enhancing method for a cross layer, multi-access convergence at the application level. Messages can be passed as shown between WLAN AP 104, MEC host 1 110, UE 102, MEC host 2 112, and a cellular network (e.g., base station 106). In an example, the multi-RAT information acquisition procedure, along with the decisions taken by MAMS at MEC platform level, may be based on information exploitable for MEC-enabled and MAMS-based SSC enhancing inter-RAT mobility.

At state 1701, the UE 102 can be in an initial state as shown in FIG. 17. In Message 1702, the WLAN AP 104 can provide information on Wi-Fi signal strength to the MEC host 1 110 and in Message 1704 a WLAN information update can be provided to MEC host 2 112. At this point, in operation 1706, MAMS evaluates the current MEC host 1 110 load and MEC Host 2 112 load. At operation 1708, the UE 102 is under both WLAN AP 104 and base station 106 coverage, and the MEC application is still instantiated at MEC host 1 110.

In Message 1710, radio measurements (e.g., RSRP) are provided by the UE 102 to the base station 106. In Message 1712, the base station 106 provides RNI updates to MEC host 2 112 and MEC host 2 112 provides RNI updates to MEC host 1 110 in Message 1714. In Message 1716, the WLAN AP 104 provides Wi-Fi signal strength information to MEC Host 1 110 and in Message 1718, MEC host 1 110 provides a WLAN update to MEC host 2 112. In operation 1720, MAMS compares WLAN and RNI information and evaluates current MEC host 1 110 and MEC host 2 112 load. MEC application instant migration is decided prior to any radio handover. In operation 1722, MEC application instant migration is performed from MEC host 1 110 to MEC host 2 112. Messages and operations 1710, 1712, 1714, 1716, 1718, 1720 and 1722 may be repeated as needed and a radio handover from WLAN AP 104 to base station 106 may be performed in operation 1724.

Apart from RNI, WLAN, UE location and BW management information, the operation of the MAMS mobility framework may be optimized from the exchange of additional information among MEC platforms of a given MEC system (via the Mp3 reference point as per the ETSI MEC reference architecture), or, MEC platforms of different MEC systems (via e.g., an enhanced version of the Mp3 reference point or a newly introduced reference point). In one example, this information includes resource/channel/infrastructure-oriented traffic steering triggers, (e.g., such as buffer overflows, occurrence of packet congestion events (e.g., for V2X), link quality drop/outage events, current UE load of a radio node, current processing load of a MEC host). In another example, this information includes application-oriented traffic steering triggers, (e.g., offloading a task of considerable input size, (e.g., via a high data rate RAT (e.g., Wi-Gig)), a critical task of low input size, (e.g., via a wide-coverage RAT (e.g., 3GPP LTE)), or, a secure task via a private enterprise network (e.g., industrial WLAN)).

Figure 19:
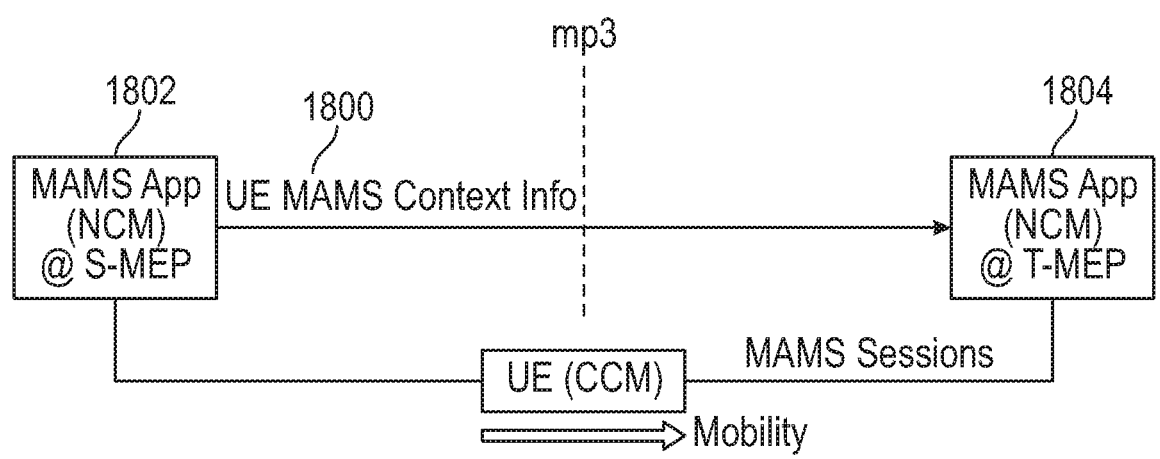
FIG. 19 includes a block diagram for UE MAMS context and state machine information transfer under UE mobility, according to an example.

FIG. 19 includes a block diagram for UE MAMS context and state machine information transfer under UE mobility. To achieve seamless MAMS session mobility, UE MAMS contextual information 1800 and state machines may be transferred from the source MEC host 1802 to the target MEC host 1804. The present techniques address the need to achieve seamless MAMS session mobility, given that there is no interface defined between the two (source and target) MAMS gateways. To remedy this issue, methods according to some embodiments use the Mp3 reference point of the ETSI MEC reference architecture (or, equivalently, an enhanced version of this reference point involving different source/target MEC systems) in order to move UE MAMS context and state machines from the source MEC host 1802 to the target MEC host 1804. FIG. 18 elaborates on a relevant MAMS mobility API example, where, MAMS apps are instantiated at the source MEC platform (S-MEP) and the target MEC platform (T-MEP), respectively. The NCM and CCM illustrated in FIG. 18 can be equated to NCM 202 and CCM 204 (FIG. 2).

Figure 20:
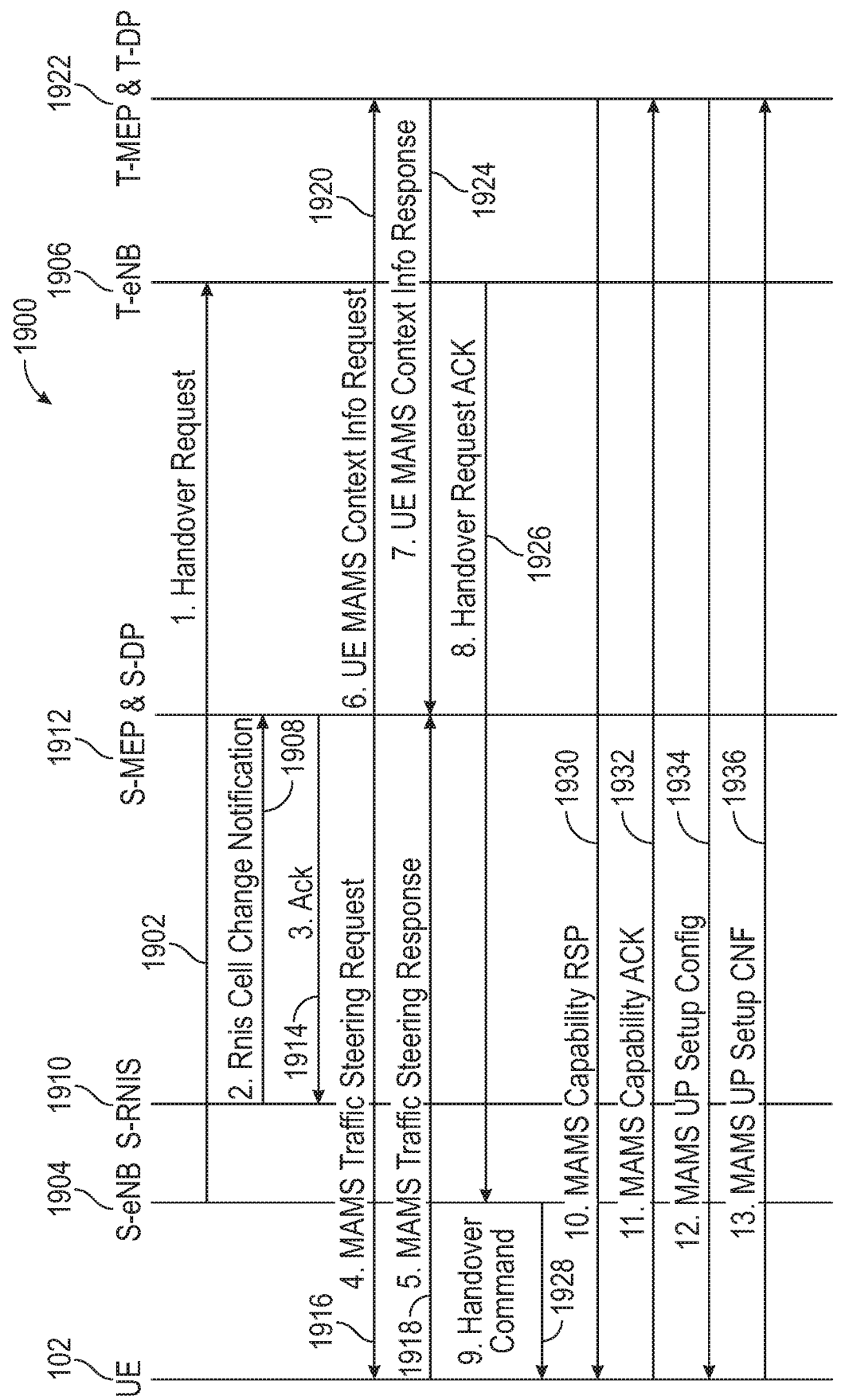
FIG. 20 includes a flowchart for seamless MAMS session mobility, according to an example.

FIG. 20 provides a flowchart 1900 for seamless MAMS session mobility. In operation 1902, the source eNB 1904 provides a handover request to the target eNB 1906. In operation 1908, the source Radio Network Information Service (RNIS) provides a cell change notification to the source mobile edge platform (S-MEP) and source data plane (S-DP) 1912.

In operation 1914, S-MEP and S-DP acknowledge the cell change notification. In operation 1916, S-MEP and S-DP 1912 provide a MAMS traffic steering request and the UE responds in operation 1918.

In operation 1920 S-MEP and S-DP 1912 provides a UE MAMS context information request to T-MEP and T-DP 1922, and T-MEP and T-DP 1922 respond in operation 1924 with a UE MAMS context info response. These operations may be supported by enhancing the Mp3 interface between two MEC hosts. In further examples, operation 1920 may further include, UE Identification information (such as UE (anchor connection) IP address) and MAMS control plane information (such as (MAMS) session ID, NCM ID, NCM/CCM end-point IP address and port number, NCM TCP/TLS/Websocket state/context info, and MAMS convergence control end-point IP address and port number).

At this point, the target eNB provides an acknowledgement 1926 of the handover request 1902, and a handover command 1928 is transmitted to the UE 102. In operations 1930, 1932, 1934 and 1936, MAMS capabilities are exchanged between the UE 102 and the T-MEP and T-DP 1922, and MAMS user plane setup occurs, completing the handover. Additional or alternate operations may be provided in other examples.

Other Apparatuses, Systems and Methods

Figure 21:
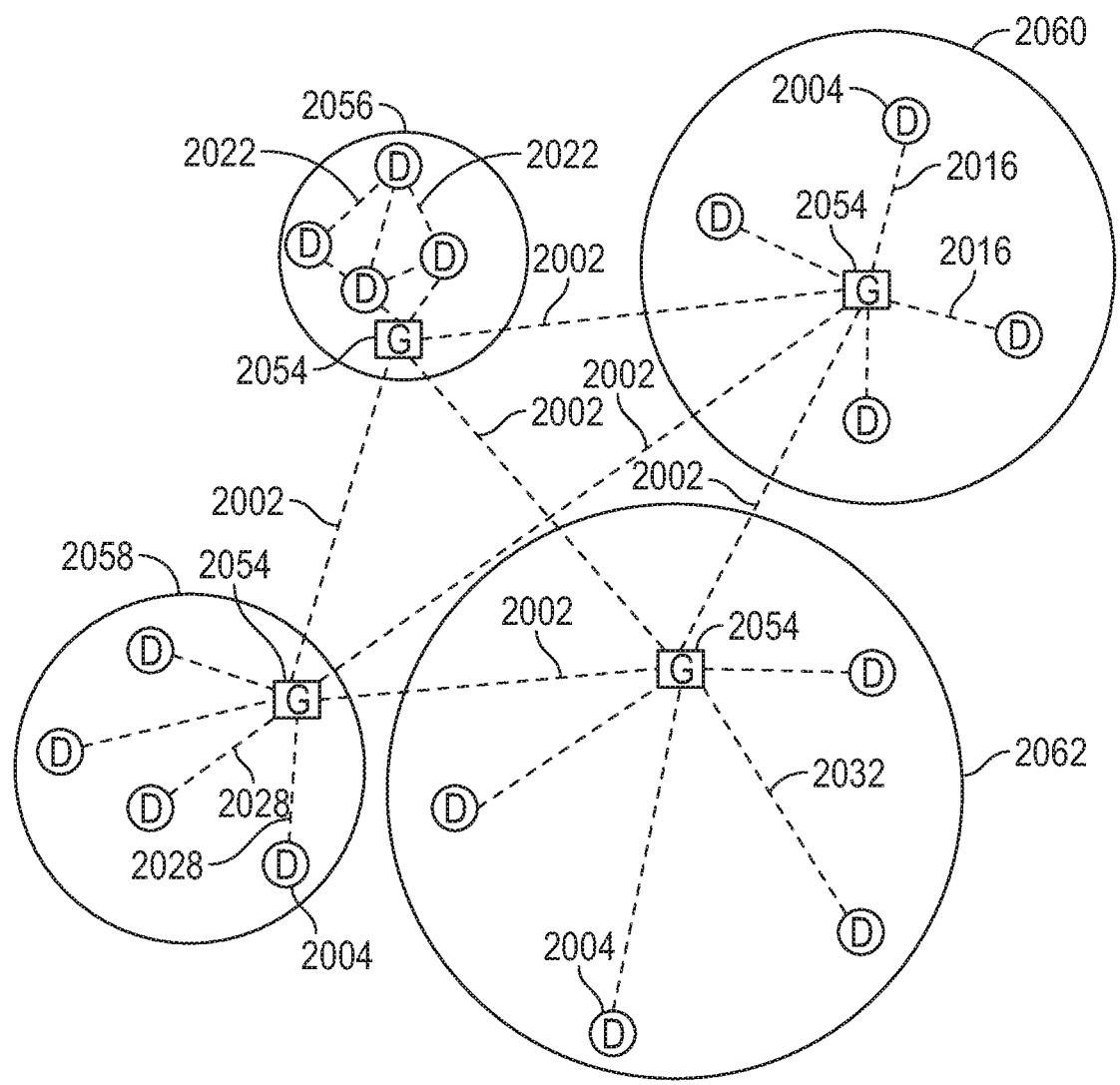
FIG. 21 illustrates a domain topology for respective Internet-of-Things (IoT) networks, according to an example.

FIG. 21 specifically provides a simplified drawing of a domain topology that may be used for a number of IoT networks comprising IoT devices 2004, with the IoT networks 2056, 2058, 2060, 2062, coupled through backbone links 2002 to respective gateways 2054. For example, a number of IoT devices 2004 may communicate with a gateway 2054, and with each other through the gateway 2054. To simplify the drawing, not every IoT device 2004, or communications link (e.g., link 2016, 2022, 2028, or 2032) is labeled. The backbone links 2002 may include any number of wired or wireless technologies, including optical networks, and may be part of a local area network (LAN), a wide area network (WAN), or the Internet. Additionally, such communication links facilitate optical signal paths among both IoT devices 2004 and gateways 2054, including the use of MUXing/deMUXing components that facilitate interconnection of the various devices.

The network topology may include any number of types of IoT networks, such as a mesh network provided with the network 2056 using Bluetooth low energy (BLE) links 2022. Other types of IoT networks that may be present include a wireless local area network (WLAN) network 2058 used to communicate with IoT devices 2004 through IEEE 802.11 (Wi-Fi®) links 2028, a cellular network 2060 used to communicate with IoT devices 2004 through an LTE/LTE-A (4G) or 5G cellular network, and a low-power wide area (LPWA) network 2062, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 2004, such as over the backbone links 2002, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 2056, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 2058, for instance, may use systems that perform standards conversion to provide multi-standard connectivity, enabling IoT devices 2004 using different protocols to communicate. Further systems may provide seamless interconnectivity across a multi-standard infrastructure comprising visible Internet resources and hidden Internet resources.

Communications in the cellular network 2060, for instance, may be enhanced by systems that offload data, extend communications to more remote devices, or both. The LPWA network 2062 may include systems that perform non-Internet protocol (IP) to IP interconnections, addressing, and routing. Further, each of the IoT devices 2004 may include the appropriate transceiver for wide area communications with that device. Further, each IoT device 2004 may include other transceivers for communications using additional protocols and frequencies. This is discussed further with respect to the communication environment and hardware of an IoT processing device depicted in FIGS. 20 and 23.

Finally, clusters of IoT devices may be equipped to communicate with other IoT devices as well as with a cloud network. This may enable the IoT devices to form an ad-hoc network between the devices, enabling them to function as a single device, which may be termed a fog device, fog platform, or fog network. This configuration is discussed further with respect to FIG. 21 below.

Figure 22:
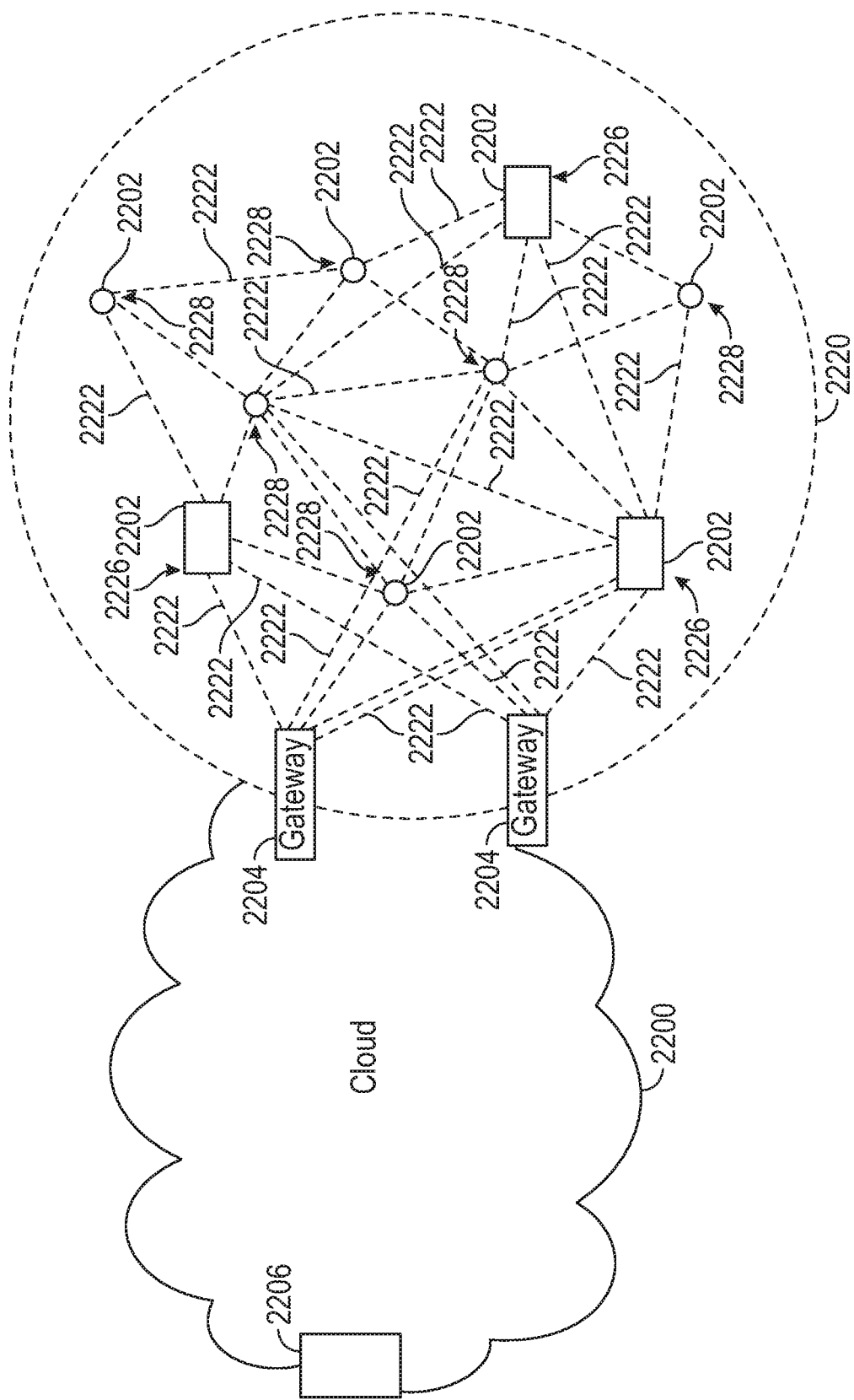
FIG. 22 illustrates a cloud computing network in communication with a mesh network of IoT devices operating as a fog device at the edge of the cloud computing network, according to an example.

FIG. 22 illustrates a cloud computing network in communication with a mesh network of IoT devices (devices 2202) operating as a fog platform in a networked scenario. The mesh network of IoT devices may be termed a fog network 2220, established from a network of devices operating at the edge of the cloud 2200. To simplify the diagram, not every IoT device 2202 is labeled.

The fog network 2220 may be considered to be a massively interconnected network wherein a number of IoT devices 2202 are in communications with each other, for example, by radio links 2222. The fog network 2220 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 2220 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 2202 are shown in this example, gateways 2204, data aggregators 2226, and sensors 2228, although any combinations of IoT devices 2202 and functionality may be used. The gateways 2204 may be edge devices that provide communications between the cloud 2200 and the fog 2220, and may also provide the backend process function for data obtained from sensors 2228, such as motion data, flow data, temperature data, and the like. The data aggregators 2226 may collect data from any number of the sensors 2228, and perform the back end processing function for the analysis. The results, raw data, or both may be passed along to the cloud 2200 through the gateways 2204. The sensors 2228 may be full IoT devices 2202, for example, capable of both collecting data and processing the data. In some cases, the sensors 2228 may be more limited in functionality, for example, collecting the data and enabling the data aggregators 2226 or gateways 2204 to process the data.

Communications from any IoT device 2202 may be passed along a convenient path (e.g., a most convenient path) between any of the IoT devices 2202 to reach the gateways 2204. In these networks, the number of interconnections provide substantial redundancy, enabling communications to be maintained, even with the loss of a number of IoT devices 2202. Further, the use of a mesh network may enable IoT devices 2202 that are very low power or located at a distance from infrastructure to be used, as the range to connect to another IoT device 2202 may be much less than the range to connect to the gateways 2204.

The fog 2220 provided from these IoT devices 2202 may be presented to devices in the cloud 2200, such as a server 2206, as a single device located at the edge of the cloud 2200, e.g., a fog device. In this example, the alerts coming from the fog device may be sent without being identified as coming from a specific IoT device 2202 within the fog 2220. In this fashion, the fog 2220 may be considered a distributed platform that provides computing and storage resources to perform processing or data-intensive tasks such as data analytics, data aggregation, and machine-learning, among others.

In some examples, the IoT devices 2202 may be configured using an imperative programming style, e.g., with each IoT device 2202 having a specific function and communication partners. However, the IoT devices 2202 forming the fog device may be configured in a declarative programming style, enabling the IoT devices 2202 to reconfigure their operations and communications, such as to determine needed resources in response to conditions, queries, and device failures. As an example, a query from a user located at a server 2206 about the operations of a subset of equipment monitored by the IoT devices 2202 may result in the fog 2220 device selecting the IoT devices 2202, such as particular sensors 2228, needed to answer the query. The data from these sensors 2228 may then be aggregated and analyzed by any combination of the sensors 2228, data aggregators 2226, or gateways 2204, before being sent on by the fog 2220 device to the server 2206 to answer the query. In this example, IoT devices 2202 in the fog 2220 may select the sensors 2228 used based on the query, such as adding data from flow sensors or temperature sensors. Further, if some of the IoT devices 2202 are not operational, other IoT devices 2202 in the fog 2220 device may provide analogous data, if available.

In other examples, the operations and functionality described above may be embodied by an IoT device machine in the example form of an electronic processing system, within which a set or sequence of instructions may be executed to cause the electronic processing system to perform any one of the methodologies discussed herein, according to an example. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, UE, MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 23:
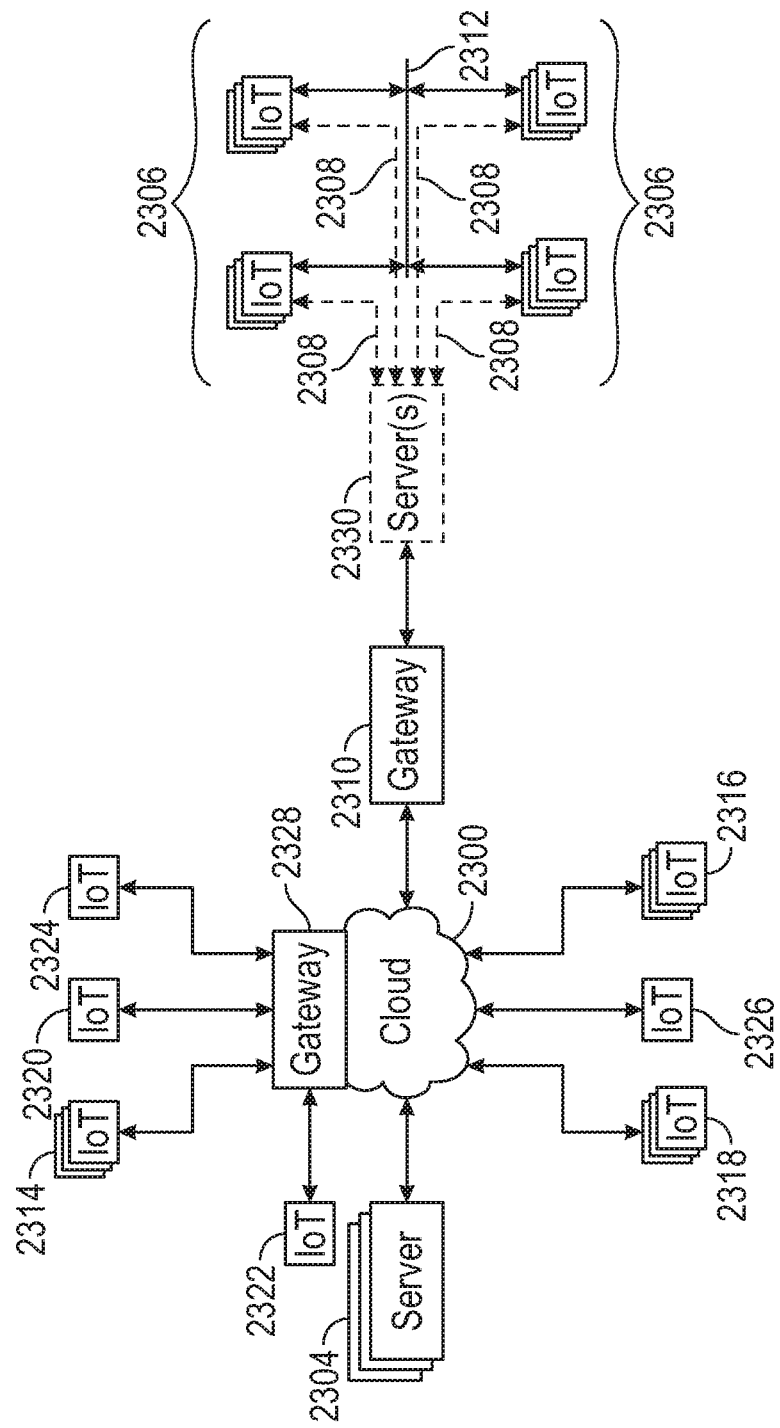
FIG. 23 includes a block diagram of a network illustrating communications among a number of IoT devices, according to an example.

FIG. 23 illustrates a drawing of a cloud computing network, or cloud 2300, in communication with a number of IoT devices. The cloud 2300 may represent the Internet, or may be a local area network (LAN), or a wide area network (WAN), such as a proprietary network for a company. The IoT devices may include any number of different types of devices, grouped in various combinations. For example, a traffic control group 2306 may include IoT devices along streets in a city. These IoT devices may include stoplights, traffic flow monitors, cameras, weather sensors, and the like. The traffic control group 2306, or other subgroups, may be in communication with the cloud 2300 through wired or wireless links 2308, such as LPWA links, optical links, and the like. Further, a wired or wireless sub-network 2312 may allow the IoT devices to communicate with each other, such as through a local area network, a wireless local area network, and the like. The IoT devices may use another device, such as a gateway 2310 or 2328 to communicate with remote locations such as the cloud 2300; the IoT devices may also use one or more servers 2330 to facilitate communication with the cloud 2300 or with the gateway

2310. For example, the one or more servers 2330 may operate as an intermediate network node to support a local edge cloud or fog implementation among a local area network. Further, the gateway 2328 that is depicted may operate in a cloud-to-gateway-to-many edge devices configuration, such as with the various IoT devices 2314, 2320, 2324 being constrained or dynamic to an assignment and use of resources in the cloud 2300.

Other example groups of IoT devices may include remote weather stations 2314, local information terminals 2316, alarm systems 2318, automated teller machines 2320, alarm panels 2322, or moving vehicles, such as emergency vehicles 2324 or other vehicles 2326, among many others. Each of these IoT devices may be in communication with other IoT devices, with servers 2304, with another IoT fog platform or system, or a combination therein. The groups of IoT devices may be deployed in various residential, commercial, and industrial settings (including in both private or public environments).

As may be seen from FIG. 23, a large number of IoT devices may be communicating through the cloud 230). This may allow different IoT devices to request or provide information to other devices autonomously. For example, a group of IoT devices (e.g., the traffic control group 2306) may request a current weather forecast from a group of remote weather stations 2314, which may provide the forecast without human intervention. Further, an emergency vehicle 2324 may be alerted by an automated teller machine 2320 that a burglary is in progress. As the emergency vehicle 2324 proceeds towards the automated teller machine 2320, it may access the traffic control group 2306 to request clearance to the location, for example, by lights turning red to block cross traffic at an intersection in sufficient time for the emergency vehicle 2324 to have unimpeded access to the intersection.

Clusters of IoT devices, such as the remote weather stations 2314 or the traffic control group 2306, may be equipped to communicate with other IoT devices as well as with the cloud 2300. This may allow the IoT devices to form an ad-hoc network between the devices, allowing them to function as a single device, which may be termed a fog platform or system (e.g., as described above with reference to FIG. 22).

Figure 24:
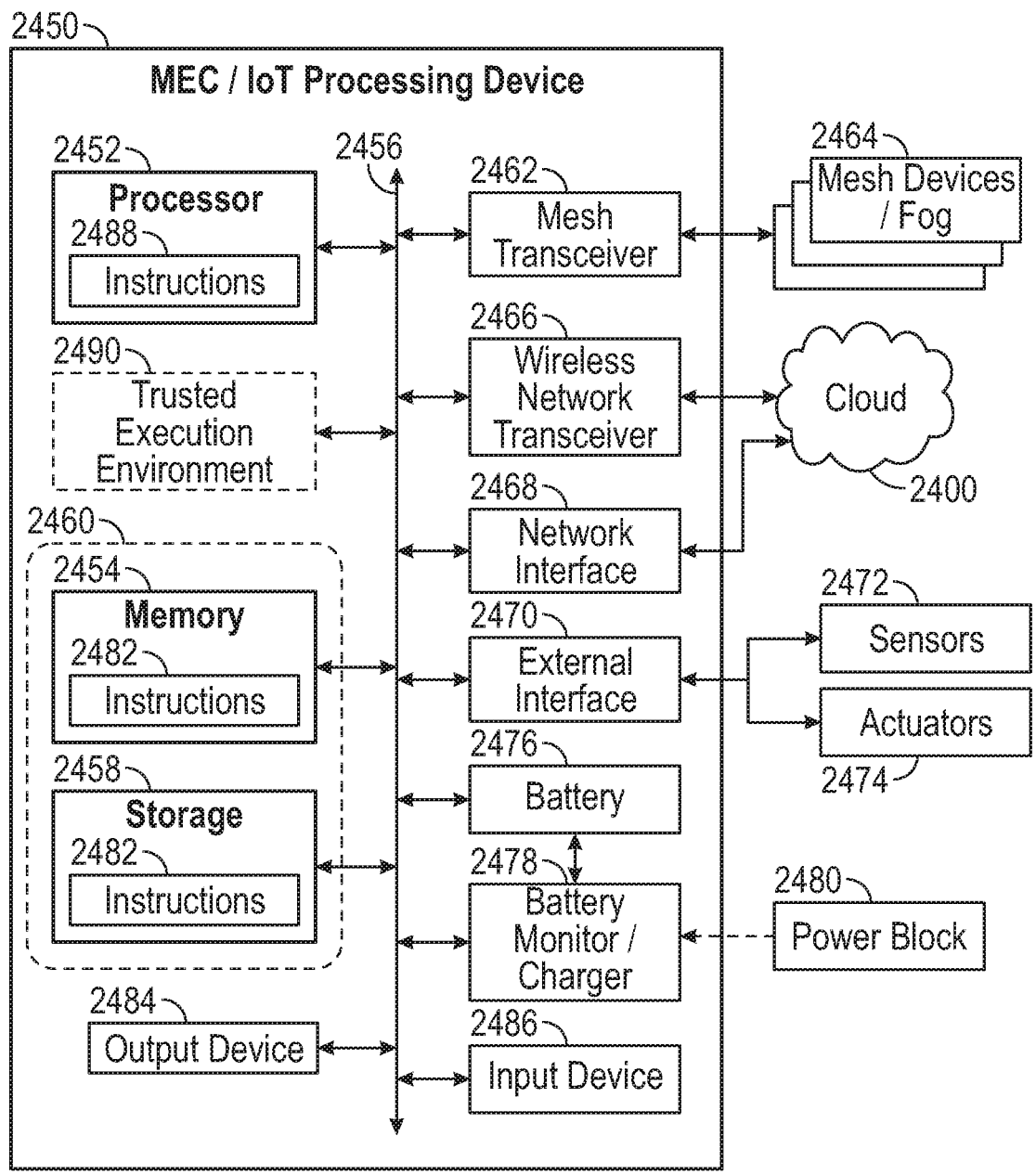
FIG. 24 includes a block diagram for an IoT processing system architecture in which any one or more of the techniques (e.g., operations, processes, methods, and methodologies) discussed herein may be performed, according to an example.

FIG. 24 is a block diagram of an example of components that may be present in an edge processing device 2450 (e.g., a computer, IoT device, edge server, etc.) for implementing any of the techniques described herein. The device 2450 may include any combinations of the components shown in the example or referenced in the disclosure above. The components may be implemented as ICs, portions thereof, discrete electronic devices, or other modules, logic, hardware, software, firmware, or a combination thereof adapted in the device 2450, or as components otherwise incorporated within a chassis of a larger system. Additionally, the block diagram of FIG. 24 is intended to depict a high-level view of components of the device 2450. However, some of the components shown may be omitted, additional components may be present, and different arrangement of the components shown may occur in other implementations.

The device 2450 may include processing circuitry in the form of a processor 2452, which may be a microprocessor, a multi-core processor, a multithreaded processor, an ultra-low voltage processor, an embedded processor, or other known processing elements. The processor 2452 may be a part of a system on a chip (SoC) in which the processor 2452 and other components are formed into a single integrated circuit, or a single package, such as the Edison™ or Galileo™ SoC boards from Intel. As an example, the processor 2452 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A12 processor from Applet Inc., a Snapdragon™ processor from Qualcomm® Technologies, Inc., or an OMAP™ processor from Texas Instruments, Inc.

The processor 2452 may communicate with a system memory 2454 over an interconnect 2456 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2458 may also couple to the processor 2452 via the interconnect 2456. In an example the storage 2458 may be implemented via a solid state disk drive (SSDD). Other devices that may be used for the storage 2458 include flash memory cards, such as SD cards, microSD cards, xD picture cards, and the like, and USB flash drives. In low power implementations, the storage 2458 may be on-die memory or registers associated with the processor 2452. However, in some examples, the storage 2458 may be implemented using a micro hard disk drive (HDD). Further, any number of new technologies may be used for the storage 2458 in addition to, or instead of, the technologies described, such resistance change memories, phase change memories, holographic memories, or chemical memories, among others.

The components may communicate over the interconnect 2456. The interconnect 2456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2456 may be a proprietary bus, for example, used in a SoC based system. Other bus systems may be included, such as an I2C interface, an SPI interface, point to point interfaces, and a power bus, among others.

The interconnect 2456 may couple the processor 2452 to a mesh transceiver 2462, for communications with other mesh devices 2464. The mesh transceiver 2462 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 2464. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 2462 may communicate using multiple standards or radios for communications at different range. For example, the device 2450 may communicate with close devices, e.g., within about 10 meters, using a local transceiver based on BLE, or another low power radio, to save power. More distant mesh devices 2464, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 2466 may be included to communicate with devices or services in the cloud 2400 via local or wide area network protocols. The wireless network transceiver 2466 may be a LPWA transceiver that follows the IEEE 802.15.4, or IEEE 802.15.4g standards, among others. The device 2450 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 2462 and wireless network transceiver 2466, as described herein. For example, the radio transceivers 2462 and 2466 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 2462 and 2466 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 2466, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 2468 may be included to provide a wired communication to the cloud 2300 or to other devices, such as the mesh devices 2464. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 2468 may be included to enable connect to a second network, for example, a NIC 2468 providing communications to the cloud over Ethernet, and a second NIC 2468 providing communications to other devices over another type of network.

Given the variety of types of applicable communications from the device to another component or network, applicable communications circuitry used by the device may include or be embodied by any one or more of components 2462, 2466, 2468, or 2470. Accordingly, in various examples, applicable means for communicating (e.g., receiving, transmitting, etc.) may be embodied by such communications circuitry.

The interconnect 2456 may couple the processor 2452 to an external interface 2470 that is used to connect external devices or subsystems. The external devices may include sensors 2472, such as accelerometers, level sensors, flow sensors, optical light sensors, camera sensors, temperature sensors, a global positioning system (GPS) sensors, pressure sensors, barometric pressure sensors, and the like. The external interface 2470 further may be used to connect the device 2450 to actuators 2474, such as power switches, valve actuators, an audible sound generator, a visual warning device, and the like.

In some optional examples, various input/output (I/O) devices may be present within, or connected to, the device 2450. For example, a display or other output device 2484 may be included to show information, such as sensor readings or actuator position. An input device 2486, such as a touch screen or keypad may be included to accept input. An output device 2484 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the device 2450.

A battery 2476 may power the device 2450, although in examples in which the device 2450 is mounted in a fixed location, it may have a power supply coupled to an electrical grid. The battery 2476 may be a lithium ion battery, or a metal-air battery, such as a zinc-air battery, an aluminum-air battery, a lithium-air battery, and the like.

A battery monitor/charger 2478 may be included in the device 2450 to track the state of charge (SoCh) of the battery 2476. The battery monitor/charger 2478 may be used to monitor other parameters of the battery 2476 to provide failure predictions, such as the state of health (SoH) and the state of function (SoF) of the battery 2476. The battery monitor/charger 2478 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/ charger 2478 may communicate the information on the battery 2476 to the processor 2452 over the interconnect 2456. The battery monitor/charger 2478 may also include an analog-to-digital (ADC) convertor that enables the processor 2452 to directly monitor the voltage of the battery 2476 or the current flow from the battery 2476. The battery parameters may be used to determine actions that the device 2450 may perform, such as transmission frequency, mesh network operation, sensing frequency, and the like.

A power block 2480, or other power supply coupled to a grid, may be coupled with the battery monitor/charger 2478 to charge the battery 2476. In some examples, the power block 2480 may be replaced with a wireless power receiver to obtain the power wirelessly, for example, through a loop antenna in the device 2450. A wireless battery charging circuit, such as an LTC4020 chip from Linear Technologies of Milpitas, Calif., among others, may be included in the battery monitor/charger 2478. The specific charging circuits chosen depend on the size of the battery 2476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2458 may include instructions 2482 in the form of software, firmware, or hardware commands to implement the techniques described herein. Although such instructions 2482 are shown as code blocks included in the memory 2454 and the storage 2458, it may be understood that any of the code blocks may be replaced with hardwired circuits, for example, built into an application specific integrated circuit (ASIC).

In an example, the instructions 2482 provided via the memory 2454, the storage 2458, or the processor 2452 may be embodied as a non-transitory, machine readable medium 2460 including code to direct the processor 2452 to perform electronic operations in the device 2450. The processor 2452 may access the non-transitory, machine readable medium 2460 over the interconnect 2456. For instance, the non-transitory, machine readable medium 2460 may be embodied by devices described for the storage 2458 or may include specific storage units such as optical disks, flash drives, or any number of other hardware devices. The non-transitory, machine readable medium 2460 may include instructions to direct the processor 2452 to perform a specific sequence or flow of actions, for example, as described with respect to the flowchart(s) and block diagram(s) of operations and functionality depicted above.

In further examples, a machine readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine readable medium" thus may include, but is not limited to, solid-state memories, and optical and magnetic media. Specific examples of machine readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine readable medium may further be transmitted or received over a communications network using a transmission medium via a network interface device utilizing any one of a number of transfer protocols (e.g., HTTP).

A machine readable medium may be provided by a storage device or other apparatus which is capable of hosting data in a non-transitory format. In an example, information stored or otherwise provided on a machine readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis)

may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus of a multi-access edge computing (MEC) component operating in a multi-access management services (MAMS) framework, the apparatus comprising: processing circuitry; and a memory device including instructions embedded thereon, wherein the instructions, which when executed by the processing circuitry, configure the processing circuitry to perform operations to: observe traffic on multi-radio links between a user equipment (UE) and a network element; and manage the traffic between the UE and the network element, based on the observing, by transmitting messages of a traffic management application programming interface (API) over a dedicated reference point.

In Example 2, the subject matter of Example 1 includes, wherein the dedicated reference point comprises an Mp1 reference point.

In Example 3, the subject matter of Example 2 includes, wherein the messages include a capabilities message, and wherein the capabilities message indicates at least one of a type of convergence method supported and a type of aggregation method supported.

In Example 4, the subject matter of Examples 2-3 includes, wherein the messages include a configuration message, and wherein the configuration message indicates at least one of a user plane configuration and a traffic steering configuration.

In Example 5, the subject matter of Examples 2-4 includes, wherein the processing circuitry is further configured to perform operations of a network connection manager (NCM) of the MAMS framework.

In Example 6, the subject matter of Examples 1-5 includes, wherein the processing circuitry is further configured to perform operations of a European Telecommunications Standards Institute (ETSI) MEC application running separately from a MEC host in the MAMS framework.

In Example 7, the subject matter of Examples 1-6 includes, wherein managing traffic includes at least one of splitting traffic and steering traffic.

In Example 8, the subject matter of Example 7 includes, wherein managing traffic includes performing link aggregation.

In Example 9, the subject matter of Example 8 includes, wherein the link aggregation is performed between at least one Wireless Local Area Network (WLAN) link and one cellular link.

In Example 10, the subject matter of Examples 7-9 includes, wherein controlling traffic includes performing path aggregation.

Example 11 is a method of a multi-access edge computing (MEC) component operating in a multi-access management services (MAMS) framework, the method comprising: observing on multi-radio links between a user equipment (UE) and a network element; and managing the traffic between the UE and the network element, based on the observing, by transmitting messages of a traffic management application programming interface (API) over a dedicated reference point.

In Example 12, the subject matter of Example 11 includes, wherein the dedicated reference point comprises an Mp1 reference point.

In Example 13, the subject matter of Example 12 includes, wherein the messages include a capabilities message, and wherein the capabilities message indicates at least one of a type of convergence method supported and a type of aggregation method supported.

In Example 14, the subject matter of Examples 12-13 includes, wherein the messages include a configuration message, and wherein the configuration message indicates at least one of a user plane configuration and a traffic steering configuration.

In Example 15, the subject matter of Examples 12-14 includes, performing operations of a network connection manager (NCM) of the MAMS framework.

In Example 16, the subject matter of Examples 11-15 includes performing operations of a European Telecommunications Standards Institute (ETSI) MEC application running separately from a MEC host in the MAMS framework.

In Example 17, the subject matter of Examples 11-16 includes wherein managing traffic includes at least one of splitting traffic and steering traffic.

In Example 18, the subject matter of Example 17 includes, wherein managing traffic includes performing link aggregation.

In Example 19, the subject matter of Example 18 includes, wherein the link aggregation is performed between at least one Wireless Local Area Network (WLAN) link and one cellular link.

In Example 20, the subject matter of Examples 17-19 includes, wherein controlling traffic includes performing path aggregation.

Example 21 is at least one non-transitory machine readable storage device comprising instructions stored thereupon, which when executed by processing circuitry of a computing device of a multi-access edge computing (MEC) component operating in a multi-access management services (MAMS0 framework, cause the processing circuitry to observe traffic on multi-radio links between a user equipment (UE) and a network element; and manage the traffic between the UE and the network element, based on the observing, by transmitting messages of a traffic management application programming interface (API) over a dedicated reference point.

In Example 22, the subject matter of Example 21 includes, wherein the dedicated reference point comprises an Mp1 reference point.

In Example 23, the subject matter of Example 22 includes, wherein the messages include a capabilities message, and wherein the capabilities message indicates at least one of a type of convergence method supported and a type of aggregation method supported.

In Example 24, the subject matter of Examples 22-23 includes, wherein the messages include a configuration message, and wherein the configuration message indicates at least one of a user plane configuration and a traffic steering configuration.

In Example 25, the subject matter of Examples 22-24 includes, wherein the processing circuitry is further configured to perform operations of a network connection manager (NCM) of the MAMS framework.

In Example 26, the subject matter of Examples 21-25 includes, wherein the processing circuitry is further configured to perform operations of a European Telecommunications Standards Institute (ETSI) MEC application running separately from a MEC host in the MAMS framework.

In Example 27, the subject matter of Examples 21-26 includes, wherein managing traffic includes at least one of splitting traffic and steering traffic.

In Example 28, the subject matter of Example 27 includes, wherein managing traffic includes performing link aggregation.

In Example 29, the subject matter of Example 28 includes, wherein the link aggregation is performed between at least one Wireless Local Area Network (WLAN) link and one cellular link.

In Example 30, the subject matter of Examples 27-29 includes, wherein controlling traffic includes performing path aggregation.

Example 31 is an apparatus of a multi-access edge computing (MEC) component operating in a multi-access management services (MAMS) framework, the apparatus comprising: processing circuitry; and a memory device including instructions embedded thereon, wherein the instructions, which when executed by the processing circuitry, configure the processing circuitry to perform operations to: request user equipment (UE) context information from a target system; receive context information responsive to the request; and perform a handover operation to the target system, the handover operation being based on parameters within the context information.

In Example 32, the subject matter of Example 31 includes, wherein the context information includes multi-access management services (MAMS) framework information.

In Example 33, the subject matter of Examples 31-32 includes, wherein the target system includes a MEC platform.

In Example 34, the subject matter of Examples 31-33 includes, wherein the target system includes data plane (DP) circuitry.

In Example 35, the subject matter of Examples 31-34 includes, wherein the request is transmitted over an Mp3 interface.

In Example 36, the subject matter of Examples 31-35 includes, wherein the context information includes at least one of UE identification information and MAMS control plane information.

In Example 37, the subject matter of Example 36 includes, wherein the context information includes at least one of UE (anchor connection) IP address; MAMS session ID, NCM ID, NCM/CCM end-point IP address and port number, NCM TCP/TLS/Websocket state/context info, and MAMS convergence control end-point IP address and port number.

Example 38 is a method of a multi-access edge computing (MEC) component operating in a multi-access management services (MAMS) framework, the method comprising: requesting user equipment (UE) context information from a target system; receiving context information responsive to the request; and performing a handover operation to the target system, the handover operation being based on parameters within the context information.

In Example 39, the subject matter of Example 38 includes, wherein the context information includes multi-access management services (MAMS) framework information.

In Example 40, the subject matter of Examples 38-39 includes, wherein the target system includes a MEC platform.

In Example 41, the subject matter of Examples 38-40 includes, wherein the target system includes data plane (DP) circuitry.

In Example 42, the subject matter of Examples 38-41 includes, wherein the request is transmitted over an Mp3 interface.

In Example 43, the subject matter of Examples 38-42 includes, wherein the context information includes at least one of UE identification information and MAMS control plane information.

In Example 44, the subject matter of Example 43 includes, wherein the context information includes at least one of UE (anchor connection) IP address; MAMS session ID, NCM ID, NCM/CCM end-point IP address and port number, NCM TCP/TLS/Websocket state/context info, and MAMS convergence control end-point IP address and port number.

Example 45 is at least one non-transitory machine readable storage device comprising instructions stored thereupon, which when executed by processing circuitry of a computing device of a multi-access edge computing (MEC) component operating in a multi-access management services (MAMS0 framework, cause the processing circuitry to request user equipment (UE) context information from a target system; receive context information responsive to the request; and perform a handover operation to the target system, the handover operation being based on parameters within the context information.

In Example 46, the subject matter of Example 45 includes, wherein the context information includes multi-access management services (MAMS) framework information.

In Example 47, the subject matter of Examples 45-46 includes, wherein the target system includes a MEC platform.

In Example 48, the subject matter of Examples 45-47 includes, wherein the target system includes data plane (DP) circuitry.

In Example 49, the subject matter of Examples 45-48 includes, wherein the request is transmitted over an Mp3 interface.

In Example 50, the subject matter of Examples 45-49 includes, wherein the context information includes at least one of UE identification information and MAMS control plane information.

In Example 51, the subject matter of Example 50 includes, wherein the context information includes at least one of UE (anchor connection) IP address; MAMS session ID, NCM ID, NCM/CCM end-point IP address and port number, NCM TCP/TLS/Websocket state/context info, and MAMS convergence control end-point IP address and port number.

Example 52 is at least one non-transitory machine-readable storage medium comprising instructions or stored data which may be configured into instructions, wherein the instructions, when configured and executed by processing circuitry of a computing device, cause the processing circuitry to perform any of the operations of Examples 1-51.

Example 53 may include one or more computer-readable storage media comprising data to cause an electronic device, upon loading, execution, configuration, or provisioning of the data by one or more processors or electronic circuitry of the electronic device, to perform one or more elements of a method described in or related to any of Examples 1-51, or any other method or process described herein.

Example 54 may include an apparatus comprising logic, modules, or circuitry to perform one or more elements of a method described in or related to any of Examples 1-51, or any other method or process described herein.

Example 55 may include a method, technique, or process as described in or related to any of Examples 1-51, or portions or parts thereof.

Example 56 may include an apparatus comprising: one or more processors and one or more computer readable media comprising instructions that, when executed by the one or more processors, cause, configure, or adapt the one or more processors to perform the method, techniques, or process as described in or related to any of Examples 1-51, or portions thereof.

Example 57 may include a signal as described in or related to any of examples 1-51, or portions or parts thereof.

Example 58 may include a signal in a wireless network as described in or related to any of Examples 1-51, or as otherwise shown and described herein.

Example 59 may include a method of performing or coordinating communications in a wireless network as described in or related to any of Examples 1-51, or as otherwise shown and described herein.

Example 60 may include a device for processing communication as described in or related to any of Examples 1-51, or as otherwise shown and described herein.

Example 61 is a network comprising respective devices and device communication mediums for performing any of the operations of Examples 1-51, or as otherwise shown and described herein.

Example 62 is a network interface card comprising circuitry, and implementing respective logic and functionality for performing any of the operations of Examples 1-51, or as otherwise shown and described herein.

Example 63 is an edge cloud computing device implementation comprising processing nodes and computing units adapted for performing any of the operations of Examples 1-51, or as otherwise shown and described herein.

Example 64 is MAMS framework element implementation comprising processing nodes and computing units adapted for performing any of the operations of Examples 1-51, or as otherwise shown and described herein.

Example 65 is an apparatus comprising means to implement of any of Examples 1-51.

Example 66 is a system to implement of any of Examples 1-65.

Example 67 is a method to implement of any of Examples 1-65.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An apparatus of a multi-access edge computing (MEC) component operating in a multi-access management services (MAMS) framework, the apparatus comprising: processing circuitry; and
a memory device including instructions stored thereon, wherein the instructions, which when executed by the processing circuitry, configure the processing circuitry to perform operations to:
observe traffic on multi-radio links between a user equipment (UE) and a network element;
manage the traffic between the UE and the network element, based on the observing, by transmitting messages of a traffic management application programming interface (API) over a dedicated reference point, wherein the messages include a capabilities message, and wherein the capabilities message indicates at least one of a type of convergence method supported and a type of aggregation method supported by the MAMS framework; and
operate a European Telecommunications Standards Institute (ETSI) MEC application that is accessible to the UE, the ETSI MEC application to execute separately from at least one MEC host in the MAMS framework.

2. The apparatus of claim 1, wherein the dedicated reference point comprises an Mp1 reference point.

3. The apparatus of claim 2, wherein the messages include a configuration message, and wherein the configuration message indicates at least one of a user plane configuration and a traffic steering configuration.

4. The apparatus of claim 2, wherein the processing circuitry is further configured to perform operations of a network connection manager (NCM) of the MAMS framework.

5. The apparatus of claim 1, wherein managing traffic includes at least one of splitting traffic and steering traffic.

6. The apparatus of claim 5, wherein managing traffic includes performing link aggregation.

7. The apparatus of claim 6, wherein the link aggregation is performed between at least one Wireless Local Area Network (WLAN) link and one cellular link.

8. The apparatus of claim 5, wherein controlling traffic includes performing path aggregation.

9. A method of a multi-access edge computing (MEC) component operating in a multi-access management services (MAMS) framework, the method comprising:
observing traffic on multi-radio links between a user equipment (UE) and a network element; and
managing the traffic between the UE and the network element, based on the observing, by transmitting messages of a traffic management application programming interface (API) over a dedicated reference point, wherein the messages include a capabilities message, and wherein the capabilities message indicates at least one of a type of convergence method supported and a type of aggregation method supported by the MAMS framework; and
operating a European Telecommunications Standards Institute (ETSI) MEC application that is accessible to the UE, the ETSI MEC application to execute separately from at least one MEC host in the MAMS framework.

10. The method of claim 9, wherein the dedicated reference point comprises an Mp1 reference point.

11. The method of claim 10, wherein the messages include a configuration message, and wherein the configuration message indicates at least one of a user plane configuration and a traffic steering configuration.

12. The method of claim 10, further comprising performing operations of a network connection manager (NCM) of the MAMS framework.

13. The method of claim 9, wherein managing traffic includes at least one of splitting traffic and steering traffic.

14. The method of claim 13, wherein managing traffic includes performing link aggregation.

15. The method of claim 14, wherein the link aggregation is performed between at least one Wireless Local Area Network (WLAN) link and one cellular link.

16. The method of claim 13, wherein controlling traffic includes performing path aggregation.

17. At least one non-transitory machine readable storage device comprising instructions stored thereupon, which when executed by processing circuitry of a computing device of a multi-access edge computing (MEC) component operating in a multi-access management services (MAMS) framework, cause the processing circuitry to:

observe traffic on multi-radio links between a user equipment (UE) and a network element;

manage the traffic between the UE and the network element, based on the observing, by transmitting messages of a traffic management application programming interface (API) over a dedicated reference point, wherein the messages include a capabilities message, and wherein the capabilities message indicates at least one of a type of convergence method supported and a type of aggregation method supported by the MAMS framework; and operate a European Telecommunications Standards Institute (ETSI) MEC application that is accessible to the UE, the ETSI MEC application to execute separately from at least one MEC host in the MAMS framework.

18. The at least one non-transitory machine readable storage device of claim 17, wherein the dedicated reference point comprises an Mp1 reference point.

19. The at least one non-transitory machine readable storage device of claim 18, wherein the messages include a configuration message, and wherein the configuration message indicates at least one of a user plane configuration and a traffic steering configuration capabilities message indicates at least one of a type of convergence method supported and a type of aggregation method supported.

20. The at least one non-transitory machine readable storage device of claim 18, wherein the processing circuitry further performs operations of a network connection manager (NCM) of the MAMS framework.

* * * * *